US011740680B2

(12) United States Patent
Hayashi et al.

(10) Patent No.: US 11,740,680 B2
(45) Date of Patent: *Aug. 29, 2023

(54) MOBILE DEVICE-BASED RADAR SYSTEM FOR APPLYING DIFFERENT POWER MODES TO A MULTI-MODE INTERFACE

(71) Applicant: Google LLC, Mountain View, CA (US)

(72) Inventors: Eiji Hayashi, Cupertino, CA (US); Vignesh Sachidanandam, Redwood City, CA (US); Leonardo Giusti, San Francisco, CA (US); Jaime Lien, Mountain View, CA (US); Patrick M. Amihood, Palo Alto, CA (US); Ivan Poupyrev, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,368

(22) Filed: Nov. 15, 2021

(65) Prior Publication Data

US 2022/0091658 A1 Mar. 24, 2022

Related U.S. Application Data

(63) Continuation of application No. 16/903,349, filed on Jun. 16, 2020, now Pat. No. 11,175,718, which is a
(Continued)

(51) Int. Cl.
*G06F 1/3231* (2019.01)
*G01S 7/40* (2006.01)
(Continued)

(52) U.S. Cl.
CPC .......... *G06F 1/3231* (2013.01); *G01S 7/4004* (2013.01); *G01S 13/56* (2013.01); *G06F 1/3265* (2013.01); *G06F 3/011* (2013.01)

(58) Field of Classification Search
None
See application file for complete search history.

(56) References Cited

U.S. PATENT DOCUMENTS

| 4,843,351 A | 6/1989 | Edwards et al. |
| 4,912,477 A | 3/1990 | Lory et al. |

(Continued)

FOREIGN PATENT DOCUMENTS

| CN | 1529970 | 9/2004 |
| CN | 1894981 | 1/2007 |

(Continued)

OTHER PUBLICATIONS

"Foreign Office Action", IN Application No. 202147042091, dated Mar. 24, 2022, 7 pages.

(Continued)

*Primary Examiner* — Whitney Moore
(74) *Attorney, Agent, or Firm* — Colby Nipper PLLC

(57) ABSTRACT

This document describes techniques and systems that enable a mobile device-based radar system for applying different power modes to a multi-mode interface. The techniques and systems include a user device having a radar system, and an interaction manager. The radar system generates a radar field, provides radar data, and operates at one of various different radar-power states. The user device analyzes the radar data to detect a presence or movement of a user within the radar field. Responsive to the detection, the radar system changes from a first radar-power state to a second radar-power state. Based on this change, the interaction manager selects a power mode, for a multi-mode interface, that corresponds to the second radar-power state, and applies the selected power mode to the multi-mode interface to provide a corresponding display via a display device.

36 Claims, 15 Drawing Sheets

Related U.S. Application Data continuation of application No. PCT/US2019/037529, filed on Jun. 17, 2019.

(51) Int. Cl.
  *G01S 13/56* (2006.01)
  *G06F 1/3234* (2019.01)
  *G06F 3/01* (2006.01)

(56) References Cited

U.S. PATENT DOCUMENTS

| | | |
|---|---|---|
| 5,121,124 A | 6/1992 | Spivey et al. |
| 6,633,254 B1 | 10/2003 | Sutphin |
| 6,671,496 B1 | 12/2003 | Hoshi |
| 7,092,690 B2 | 8/2006 | Zancewicz |
| 7,142,829 B2 | 11/2006 | Sung et al. |
| 8,560,972 B2 | 10/2013 | Wilson |
| 8,798,695 B1 | 8/2014 | Zheng et al. |
| 8,819,812 B1 | 8/2014 | Weber et al. |
| 9,075,429 B1 | 7/2015 | Karakotsios et al. |
| 9,086,476 B1 | 7/2015 | Schuss et al. |
| 9,230,160 B1 | 1/2016 | Kanter |
| 9,575,560 B2 | 2/2017 | Poupyrev et al. |
| 9,689,967 B1 | 6/2017 | Stark et al. |
| 9,811,164 B2 | 11/2017 | Poupyrev |
| 10,247,809 B2 | 4/2019 | Testar et al. |
| 10,642,367 B2 | 5/2020 | Poupyrev |
| 10,754,005 B2 | 8/2020 | Lien et al. |
| 10,782,390 B2 | 9/2020 | Lien et al. |
| 10,795,009 B2 | 10/2020 | Lien et al. |
| 10,845,477 B2 | 11/2020 | Amihood et al. |
| 10,914,834 B2 | 2/2021 | Amihood et al. |
| 11,079,470 B2 | 8/2021 | Lien et al. |
| 11,175,718 B2 | 11/2021 | Hayashi et al. |
| 11,550,048 B2 | 1/2023 | Hayashi et al. |
| 2002/0003488 A1 | 1/2002 | Levin et al. |
| 2003/0179138 A1 | 9/2003 | Chen |
| 2006/0058035 A1 | 3/2006 | Tsuruno |
| 2006/0166620 A1 | 7/2006 | Sorensen |
| 2007/0200747 A1 | 8/2007 | Okai et al. |
| 2008/0065291 A1 | 3/2008 | Breed |
| 2008/0204322 A1 | 8/2008 | Oswald et al. |
| 2008/0316085 A1 | 12/2008 | Rofougaran et al. |
| 2009/0180466 A1 | 7/2009 | Soul et al. |
| 2009/0323782 A1 | 12/2009 | Baker et al. |
| 2010/0245091 A1 | 9/2010 | Margon |
| 2011/0074621 A1 | 3/2011 | Wintermantel |
| 2011/0140949 A1 | 6/2011 | Lee |
| 2011/0181510 A1 | 7/2011 | Hakala et al. |
| 2011/0234492 A1 | 9/2011 | Ajmera et al. |
| 2011/0267958 A1 | 11/2011 | Sekiya et al. |
| 2012/0001802 A1 | 1/2012 | Grau Besoli et al. |
| 2012/0092205 A1 | 4/2012 | Bourdelais et al. |
| 2012/0146796 A1 | 6/2012 | Margon et al. |
| 2012/0268306 A1 | 10/2012 | Coburn et al. |
| 2012/0270564 A1 | 10/2012 | Gum et al. |
| 2012/0280900 A1 | 11/2012 | Wang et al. |
| 2013/0069816 A1 | 3/2013 | Ash et al. |
| 2013/0176161 A1 | 7/2013 | Derham et al. |
| 2014/0368423 A1 | 12/2014 | Brenckle et al. |
| 2015/0198700 A1 | 7/2015 | Morita et al. |
| 2015/0348493 A1* | 12/2015 | Chae .............. G06F 3/0481 345/212 |
| 2016/0034050 A1 | 2/2016 | Ady et al. |
| 2016/0041618 A1 | 2/2016 | Poupyrev |
| 2016/0054436 A1 | 2/2016 | Lee et al. |
| 2016/0103199 A1 | 4/2016 | Rappaport |
| 2016/0109564 A1 | 4/2016 | Sieber et al. |
| 2016/0174842 A1 | 6/2016 | Hyde et al. |
| 2016/0178730 A1 | 6/2016 | Trotta et al. |
| 2016/0204929 A1 | 7/2016 | Shimizu et al. |
| 2016/0252607 A1 | 9/2016 | Saboo et al. |
| 2017/0086202 A1 | 3/2017 | Chen |
| 2017/0090011 A1 | 3/2017 | West et al. |
| 2017/0097413 A1 | 4/2017 | Gillian et al. |
| 2017/0201887 A1 | 7/2017 | Farshchian et al. |
| 2017/0289766 A1 | 10/2017 | Scott et al. |
| 2017/0307727 A1 | 10/2017 | Goda |
| 2017/0307728 A1 | 10/2017 | Eshraghi et al. |
| 2017/0310758 A1 | 10/2017 | Davis et al. |
| 2017/0366242 A1 | 12/2017 | Lee et al. |
| 2018/0031673 A1 | 2/2018 | Kim et al. |
| 2018/0046258 A1 | 2/2018 | Poupyrev |
| 2018/0095161 A1 | 4/2018 | Kellum et al. |
| 2018/0196501 A1 | 7/2018 | Trotta et al. |
| 2018/0329049 A1* | 11/2018 | Amihood .............. G01S 13/88 |
| 2018/0329050 A1 | 11/2018 | Amihood et al. |
| 2018/0329466 A1* | 11/2018 | Calinov .............. G06F 1/28 |
| 2018/0348339 A1 | 12/2018 | Lien et al. |
| 2018/0348340 A1 | 12/2018 | Lien et al. |
| 2018/0348353 A1 | 12/2018 | Lien et al. |
| 2019/0114021 A1* | 4/2019 | Oliver .............. G06F 3/0412 |
| 2019/0120954 A1 | 4/2019 | Kim et al. |
| 2019/0270410 A1* | 9/2019 | Baur .............. G08G 1/09626 |
| 2020/0348390 A1 | 11/2020 | Lien et al. |
| 2020/0393890 A1 | 12/2020 | Hayashi et al. |
| 2021/0025968 A1 | 1/2021 | Lien et al. |
| 2021/0072375 A1 | 3/2021 | Amihood et al. |
| 2021/0088643 A1 | 3/2021 | Hayashi |

FOREIGN PATENT DOCUMENTS

| | | |
|---|---|---|
| CN | 101354438 | 1/2009 |
| CN | 102087362 | 6/2011 |
| CN | 102301255 | 12/2011 |
| CN | 102323853 | 1/2012 |
| CN | 102741775 | 10/2012 |
| CN | 103416036 | 11/2013 |
| CN | 103534664 | 1/2014 |
| CN | 105445735 | 3/2016 |
| CN | 108885485 | 11/2018 |
| EP | 1548461 | 6/2005 |
| EP | 1775600 | 4/2007 |
| EP | 3043238 | 7/2016 |
| EP | 3073574 | 9/2016 |
| FR | 3017722 | 8/2015 |
| JP | H06337401 | 12/1994 |
| JP | H07234271 | 9/1995 |
| JP | H11326508 | 11/1999 |
| JP | 2002151934 | 5/2002 |
| JP | 200151049 | 8/2002 |
| JP | 2002267743 | 9/2002 |
| JP | 2003315447 | 11/2003 |
| JP | 2006509192 | 3/2006 |
| JP | 2007166272 | 6/2007 |
| JP | 2007208702 | 8/2007 |
| JP | 2008145423 | 6/2008 |
| JP | 2009122129 | 6/2009 |
| JP | 2010191288 | 9/2010 |
| JP | 2012133524 | 7/2012 |
| JP | 2012222574 | 11/2012 |
| JP | 2013033191 | 2/2013 |
| JP | 2013044881 | 3/2013 |
| JP | 2013515275 | 5/2013 |
| JP | 2013539854 | 10/2013 |
| JP | 2014059284 | 4/2014 |
| JP | 2015052982 | 3/2015 |
| JP | 2016126234 | 7/2016 |
| JP | 2016166859 | 9/2016 |
| JP | 2017038347 | 2/2017 |
| JP | 2018050175 | 3/2018 |
| KR | 20110053493 | 5/2011 |
| KR | 101199169 | 7/2012 |
| KR | 101566622 | 11/2015 |
| KR | 101603851 | 3/2016 |
| KR | 101814486 | 1/2018 |
| TW | 1287367 | 7/2006 |
| WO | 9723063 | 6/1997 |
| WO | 2010099268 | 9/2010 |
| WO | 2011152902 | 12/2011 |
| WO | 2014094928 | 6/2014 |
| WO | 2015070676 | 5/2015 |
| WO | 2015184406 | 12/2015 |
| WO | 2017044038 | 3/2017 |

(56) References Cited

FOREIGN PATENT DOCUMENTS

| WO | 2017062566 | 4/2017 |
|---|---|---|
| WO | 2018208958 | 11/2018 |
| WO | 2018222266 | 12/2018 |
| WO | 2018222267 | 12/2018 |
| WO | 2018222268 | 12/2018 |
| WO | 2020236148 | 11/2020 |
| WO | 2020256692 | 12/2020 |

OTHER PUBLICATIONS

"Foreign Office Action", CN Application No. 201980094660.1, dated Apr. 20, 2022, 24 pages.
"Non-Final Office Action", U.S. Appl. No. 16/771,647, dated Jun. 1, 2022, 9 pages.
"International Preliminary Report on Patentability", Application No. PCT/US2019/033116, dated Nov. 16, 2021, 8 pages.
"International Preliminary Report on Patentability", Application No. PCT/US2019/037529, dated Dec. 21, 2021, 9 pages.
"Foreign Office Action", JP Application No. 2021-557064, dated Jun. 14, 2022, 12 pages.
"Foreign Office Action", EP Application No. 18727945.0, dated Jul. 4, 2022, 5 pages.
"Corrected Notice of Allowability", U.S. Appl. No. 15/974,502, dated Jan. 7, 2021, 2 pages.
"EP Appeal Decision", EP Application No. 10194359.5, dated May 28, 2019, 20 pages.
"Extended European Search Report", EP Application No. 20170421.0, dated Jun. 9, 2020, 7 pages.
"Final Office Action", U.S. Appl. No. 15/974,528, dated Jun. 5, 2020, 12 Pages.
"Final Office Action", U.S. Appl. No. 15/974,502, dated Jun. 4, 2020, 13 Pages.
"Final Office Action", U.S. Appl. No. 16/903,349, dated Apr. 9, 2021, 15 pages.
"Foreign Notice of Allowance", KR Application No. 10-2019-7027655, dated Apr. 13, 2021, 3 pages.
"Foreign Notice of Allowance", KR Application No. 1020197027448, dated Jun. 14, 2021, 5 pages.
"Foreign Office Action", CN Application No. 201880007506.1, dated Apr. 2, 2020, 11 pages.
"Foreign Office Action", TW Application No. 107107979, dated Sep. 7, 2020, 21 pages.
"Foreign Office Action", KR Application No. 10-2019-7027448, dated Dec. 16, 2020, 26 pages.
"Foreign Office Action", KR Application No. 10-2019-7027655, dated Nov. 18, 2020, 27 pages.
"Foreign Office Action", TW Application No. 107107979, dated Apr. 12, 2019, 3 pages.
"Foreign Office Action", JP Application No. 2019-551566, dated Jan. 26, 2021, 5 pages.
"Foreign Office Action", JP Application No. 2019-551565, dated Mar. 30, 2021, 6 pages.
"Foreign Office Action", IN Application No. 201947037204, dated Apr. 21, 2021, 6 pages.
"Foreign Office Action", IN Application No. 201947036923, dated Jun. 4, 2021, 6 pages.
"Foreign Office Action", TW Application No. 107115694, dated Dec. 21, 2018, 6 pages.
"Foreign Office Action", TW Application No. 107107729, dated Feb. 18, 2019, 7 pages.
"Foreign Office Action", KR Application No. 10-2019-7030098, dated Jan. 5, 2021, 8 pages.
"Foreign Office Action", TW Application No. 107107978, dated Jan. 15, 2019, 9 pages.
"Foreign Office Action", TW Application No. 107107979, dated Oct. 16, 2018, 9 pages.
"Foreign Office Action", JP Application No. 2019-551702, dated Dec. 23, 2020, 9 pages.

"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Preliminary Report on Patentability", Application No. PCT/US2018/031862, dated Nov. 21, 2019, 12 pages.
"International Preliminary Report on Patentability", Application No. PCT/US2018/025506, dated May 15, 2019, 15 pages.
"International Preliminary Report on Patentability", Application No. PCT/US2018/025489, dated Aug. 30, 2019, 18 pages.
"International Preliminary Report on Patentability", Application No. PCT/US2018/025495, dated Dec. 12, 2019, 8 pages.
"International Search Report", Application No. PCT/US2018/025489, dated Jul. 18, 2018, 4 pages.
"International Search Report", Application No. PCT/US2018/025506, dated Jul. 18, 2018, 4 pages.
"International Search Report and Written Opinion", Application No. PCT/US2019/033116, dated Jan. 29, 2020, 13 pages.
"International Search Report and Written Opinion", Application No. PCT/US2018/031862, dated Jul. 26, 2018, 13 pages.
"International Search Report and Written Opinion", Application No. PCT/US2019/037529, dated Mar. 24, 2020, 14 pages.
"International Search Report and Written Opinion", Application No. PCT/US2018/025495, dated Jun. 28, 2018, 14 pages.
"Non-Final Office Action", U.S. Appl. No. 15/928,346, dated Jan. 10, 2020, 11 Pages.
"Non-Final Office Action", U.S. Appl. No. 16/929,762, dated Feb. 8, 2021, 11 pages.
"Non-Final Office Action", U.S. Appl. No. 15/928,273, dated Feb. 18, 2020, 11 Pages.
"Non-Final Office Action", U.S. Appl. No. 15/974,502, dated Feb. 18, 2020, 11 Pages.
"Non-Final Office Action", U.S. Appl. No. 15/974,528, dated Feb. 18, 2020, 11 Pages.
"Non-Final Office Action", U.S. Appl. No. 16/903,349, dated Jan. 21, 2021, 13 pages.
"Non-Final Office Action", U.S. Appl. No. 15/928,386, dated Jan. 7, 2020, 14 Pages.
"Non-Final Office Action", U.S. Appl. No. 15/791,044, dated Sep. 30, 2019, 22 Pages.
"Non-Final Office Action", U.S. Appl. No. 14/513,875, dated Feb. 21, 2017, 9 pages.
"Notice of Allowance", U.S. Appl. No. 15/928,386, 7 Pages.
"Notice of Allowance", U.S. Appl. No. 16/929,762, dated Jun. 15, 2021, 7 pages.
"Notice of Allowance", U.S. Appl. No. 14/513,875, dated Jun. 28, 2017, 7 pages.
"Notice of Allowance", U.S. Appl. No. 15/928,273, dated Jul. 15, 2020, 7 pages.
"Notice of Allowance", U.S. Appl. No. 15/974,502, dated Aug. 12, 2020, 7 pages.
"Notice of Allowance", U.S. Appl. No. 15/974,528, dated Aug. 27, 2020, 7 pages.
"Notice of Allowance", U.S. Appl. No. 15/791,044, dated Feb. 12, 2020, 8 pages.
"Notice of Allowance", U.S. Appl. No. 15/928,346, dated May 18, 2020, 8 pages.
"Notice of Allowance", U.S. Appl. No. 16/903,349, dated Jul. 14, 2021, 8 pages.
"Pre-Interview Communication", U.S. Appl. No. 14/513,875, dated Oct. 21, 2016, 3 pages.
"Samsung Galaxy S4 Air Gestures", Video retrieved from https://www.youtube.com/watch?v=375Hb87yGcg, May 7, 2013, 4 pages.
"Written Opinion", Application No. PCT/US2018/025489, dated May 10, 2019, 7 pages.
"Written Opinion", Application No. PCT/US2018/025489, dated Jul. 18, 2018, 8 pages.
"Written Opinion", Application No. PCT/US2018/025506, dated Jul. 18, 2018, 8 pages.
Arbabian, Amin et al., "A 94 GHz mm-Wave-to-Baseband Pulsed-Radar Transceiver with Applications in Imaging and Gesture Recognition", IEEE Journal of Solid State Circuits, Apr. 2015, pp. 1055-1071.

(56) References Cited

OTHER PUBLICATIONS

Chen, Qingchao et al., "Indoor Target Tracking Using High Doppler Resolution Passive Wi-Fi Radar", 2015 IEEE International Conference on Acoustics, Speech and Signal Processing (ICASSP), pp. 5565-5569, XP055311663, DOI: 10.1109/ICASSP.2015.7179036; ISBN: 978-1-4673-6997-8, Apr. 1, 2015, 5 pages.

Fan, Tenglong et al., "Hand Gesture Recognition Based on Wi-Fi Chipsets", 2017 IEEE Radio and Wireless Symposium (RWS), Jan. 15, 2017 IEEE, pp. 98-100., 2017, 3 pages.

Lin, Jing-Shiun et al., "Study of Sub-6GHz Hybrid Beamforming Technology", ICT Journal No. 168, Dec. 29, 2016, 7 pages.

Malanowski, Mateusz et al., "Digital beamforming for passive coherent location radar", Jun. 2008, 6 pages.

Tenglong, Fan et al., "Hand Gesture Recognition Based on Wi-Fi Chipsets", 2017 IEEE Radio and Wireless Symposium( RWS). IEEE, Jan. 15, 2017 (Jan. 15, 2017), pp. 98-100, XP033080528, DOI: 10.1109/RWS.2017.7885956, Jan. 15, 2017, 3 pages.

"Foreign Office Action", CN Application No. 201880019349.6, dated Sep. 9, 2022, 21 pages.

"Foreign Office Action", EP Application No. 19735072.1, dated Oct. 25, 2022, 4 pages.

"Notice of Allowance", U.S. Appl. No. 16/771,647, dated Oct. 19, 2022, 12 pages.

"Foreign Office Action", JP Application No. 2021-557063, dated Jan. 24, 2023, 11 pages.

"Foreign Office Action", IN Application No. 202147041914, dated Feb. 24, 2023, 7 pages.

"Foreign Office Action", EP Application No. 19735072.1, dated Mar. 29, 2023, 8 pages.

"Foreign Office Action", CN Application No. 201880019349.6, dated Mar. 30, 2023, 6 pages.

"Getting Started with Walabot", https://media.digikey.com/pdf/Data%20Sheets/Sparkfun%20PDFs/Getting_Started_with_Walabot_Web.pdf, Feb. 20, 2018, 18 pages.

Guo, Hanqing , et al., "HICFR: Real Time 3D Indoor Human Image Capturing Based on FMCW Radar", Dec. 8, 2018, 25 pages.

\* cited by examiner

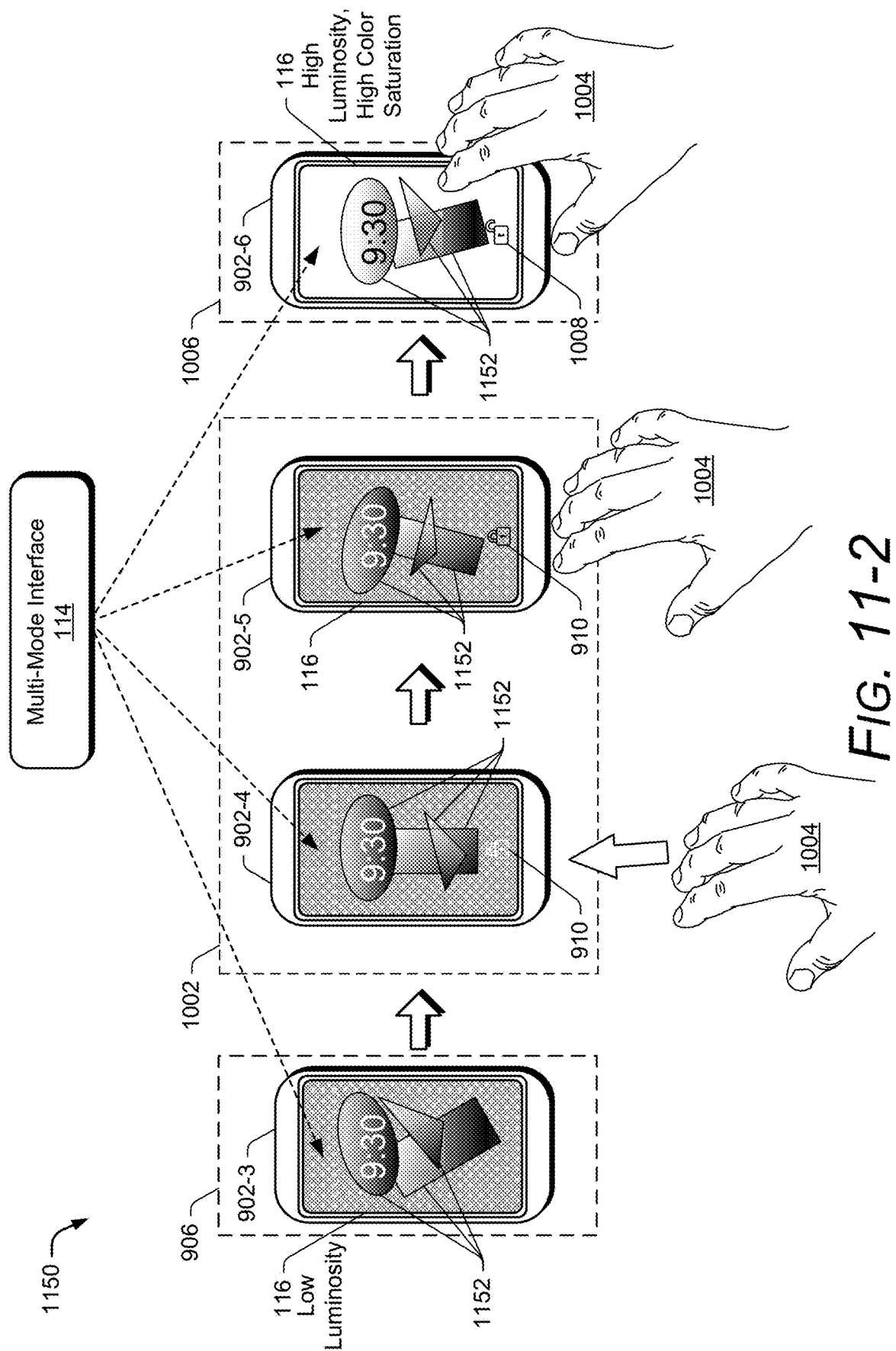

MOBILE DEVICE-BASED RADAR SYSTEM FOR APPLYING DIFFERENT POWER MODES TO A MULTI-MODE INTERFACE

RELATED APPLICATIONS

This application is a continuation application of U.S. application Ser. No. 16/903,349, filed Jun. 16, 2020, which is a continuation application of International Application No. PCT/US2019/037529, filed Jun. 17, 2019, the disclosures of which are incorporated in their entirety by reference herein.

BACKGROUND

Mobile devices continue to have more and more software available for processing, which consumes more and more power (e.g., battery power). To address increases in power consumption, various power-saving techniques to reduce power consumption and extend battery life cycle have been introduced. Some conventional power-saving techniques include using a timer to determine a period of inactivity (e.g., no explicit interaction with the mobile device by a user) and disabling certain background application programs after the timer expires, closing applications not currently being used, and so forth.

Some features and functionalities have become available to many mobile devices that enable the mobile devices to be more useful, such as by displaying information (e.g., notifications, date and time, etc.) without requiring the user to press a button to turn on the display. A disadvantage of these features and functionalities is the additional power required for operation. Some systems can be "aware" of when the user is near the mobile device, such as by using a camera and processing image or video data to detect the user. Then, the display is turned on to present information based on that detection. However, the power consumed by continuously operating the camera and processing the image or video data may not be, in some cases, substantially less than simply leaving the display on. Accordingly, current power-saving techniques are inefficient for some mobile devices.

SUMMARY

This document describes techniques and systems that enable a mobile device-based radar system for applying different power modes to a multi-mode interface. The techniques and systems use a radar field to enable a mobile device to accurately determine the presence or absence of a user near the mobile device and further determine movements of the user to implicitly interact, or communicate, with the mobile device. Using these techniques, the mobile device can account for the user's nonverbal communication cues to determine and maintain an awareness of the user in its environment, and respond to indirect interactions by the user to educate the user that the mobile device is aware of the user and the user's movements with respect to the mobile device. In addition, the mobile device can apply various power states to components of the mobile device to reduce power consumption depending on the level of interaction by the user with the mobile device.

For example, different power states (e.g., radar-power states) are applied to the radar system and corresponding power modes are applied to the multi-mode interface. The different radar-power states may be applied only in response to the level of the user's indirect (implicit) interaction with the mobile device in order to reduce power consumption while at the same time providing a system that is continuously "aware of" and responsive to the user's interactions with the mobile device. Responding to the user's indirect interactions can include providing visual feedback, using different power modes of the multi-mode interface, on a display of the mobile device based on the user's movements relative to the mobile device. The multi-mode interface operates and is provided as part of the mobile device's digital environment (e.g., the multi-mode interface may be considered as a "canvas" for the operating system of the mobile device), separate and independent of an application program executed by the mobile device.

This summary is provided to introduce simplified concepts concerning a mobile device-based radar system for applying different power modes to a multi-mode interface, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a mobile device-based radar system for applying different power modes to a multi-mode interface are described in this document with reference to the following drawings. The same numbers are used throughout the drawings to reference like features and components:

FIG. 3-1 illustrates an example radar system as part of a computing device.

FIG. 3-2 illustrates an example transceiver and processor.

FIG. 11-1 illustrates another example implementation of different power modes of a multi-mode interface based on a level of indirect interaction by a user with a mobile device.

FIG. 11-2 illustrates yet another example implementation of different power modes of a multi-mode interface based on a level of indirect interaction by a user with a mobile device.

DETAILED DESCRIPTION

Overview

Figure 1:
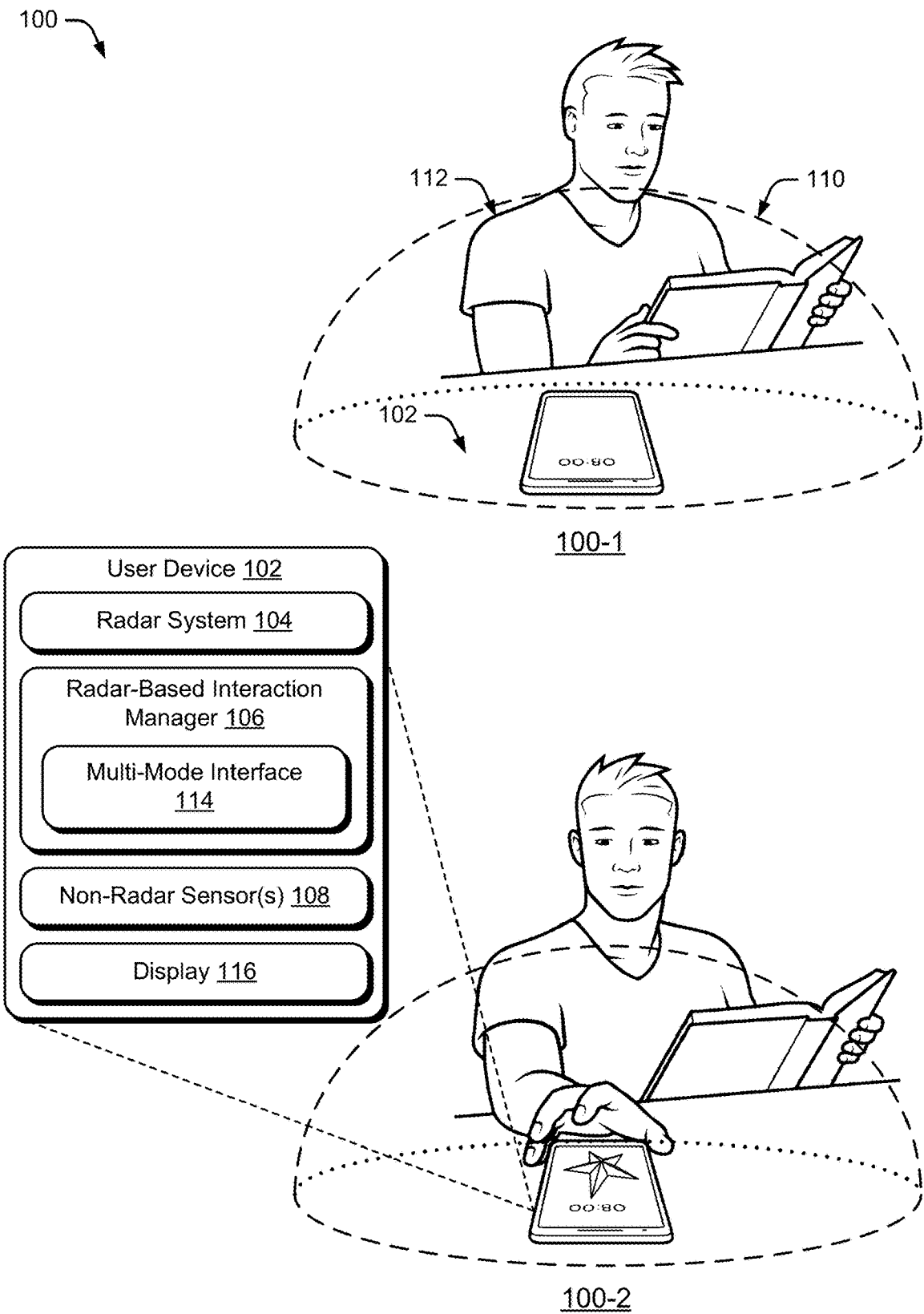
FIG. 1 illustrates an example environment in which techniques enabling a mobile device-based radar system for applying different power modes to a multi-mode interface can be implemented.

This document describes techniques and systems that enable a mobile device-based radar system for applying different power modes to a multi-mode interface. By applying different power modes to the multi-mode interface, the mobile device-based radar system provides visual feedback, using the multi-mode interface, in response to implicit interactions by the user with the mobile device to reduce power consumption of the mobile device while educating the user that the mobile device is aware of the user's movements and can respond in subtle and interesting ways. Implicit interactions, or communications, include a user's presence, spatial relations, and hand movements around the mobile device. In particular, the implicit interactions by the user with the mobile device are movements of the user near the mobile device that are not intended to initiate or perform a function on the device, but that can nevertheless be harbingers of change in the user's state of usage with respect to the device. Accordingly, implicit interactions are not considered explicit or direct user input but are instead actions by the user that indirectly provide input to the mobile device. Put another way, implicit interactions include user actions near the mobile device that are not intended to provide direct input but which the mobile device can use to determine, or interpret as, an implied or indirect input. Example implicit interactions include a user entering an area (e.g., radar field) having a particular radius around the mobile device, a user's hand reaching toward (or away from) the mobile device, while in a dormant or other lower-power state, within a particular threshold distance to pick it up and use it, a user looking toward the mobile device, a user moving their head toward the mobile device within a specified distance such as to look more closely at the mobile device, a user nodding or shaking their head while facing the mobile device, a user exiting the radar field, and so forth. In contrast to implicit interactions, explicit user inputs may include touch input to a touchscreen of the mobile device, actuation of a button on the mobile device, a gesture such as a screen swipe, screen tap, or screen double tap, or reaching toward or making an air gesture such as a wave over the mobile device while already active or in a higher-power state, etc. so as to directly interact with the mobile device, or an application program or user-interface (UI) element of the mobile device, in a way that is intended by the user to initiate a particular function.

The described techniques and systems employ a radar system to provide a rich ambient multi-mode interface experience that enables limited functionality based on a power mode, of the multi-mode interface, corresponding to a user's implicit interactions with the mobile device. Rather than reacting only to explicit user input, these techniques provide feedback to the user to indicate that the device is aware of and is detecting the user's movements and can react in interesting ways. The user's implicit interaction may be discerned by determining an unauthenticated user's movements relative to the device (e.g., when the device is in a locked state).

The multi-mode interface includes several power modes including, for example, a dormant mode, an ambient mode, an alert mode, and an active mode. Varying levels of power are provided to, or consumed by, a display device of the mobile device based on which power mode of the multi-mode interface is currently being executed at least because of specific functionalities that are enabled by each power mode.

In an example, when the radar system is in a lower-power mode (e.g., idle mode), the mobile device can also be in a lower-power state by turning off or otherwise reducing the power consumption of various functions such as a display device, a touchscreen, a microphone, a voice assistant, and so forth. At the same time, the multi-mode interface may be in the dormant mode, such that the interface is in a dormant state and provides a black display e.g., a power-off display or power-on display using black pixels. In some cases, the display device is considered to be in an "OFF" state when the multi-mode interface is in the dormant mode such that the display device is turned off and no power is provided to the display device to illuminate pixels. In this way, the black display can include an electronic ink display that uses other ink colors (e.g., white) in addition to black ink. The dormant mode may be applied to the multi-mode interface when the user is not near the mobile device (e.g., user is not detected within a specified distance of the mobile device) or when the mobile device is placed in the user's pocket, purse, or bag where the device detects that it is within a dark location and the user is not interacting (implicitly or explicitly) with the mobile device.

When the radar system detects the user in the area, the user device autonomously transitions the radar system from an idle power mode to a low-power attention mode and correspondingly transitions the multi-mode interface from the dormant mode to the ambient mode. Here, the user device is aware of the user's presence within a specified distance of the device (e.g., within a radar field of the radar system). The device operates in the lower-power state and the display screen is set to a low luminosity to reduce power consumption based on the level of user interaction with the user device. Because the user is simply present, the user's interaction is low, but the user device can provide a low-luminosity display to indicate that the user device detects the user's presence and is monitoring for additional interactions. As described herein, luminosity refers to the perceived brightness of an object by a human. Modifying the luminosity may include modifying luminance (e.g., brightness), contrast, and/or opaqueness. A low-luminosity may refer to a luminosity level that is less than a predefined threshold level, such as approximately 50%, 40%, 25%, 15%, and so on. This predefined threshold may be set by a manufacturer or defined by a setting selected by the user. A high-luminosity may refer to a luminosity level that is greater than a predefined threshold level, e.g., approximately 50%, 60%, 75%, 85%, 95%, or 100%. Any suitable number of luminosity levels can be implemented, such as three (e.g., low, medium, high), four, five, or more, to correlate with the number of modes of the multi-mode interface.

In some cases, one or more user-interface elements (e.g., a clock, a battery-charge level indicator, a home button, a lock button, etc.) are displayed on the display screen with low luminosity, such as low brightness. The display screen can also display an image with low luminosity and color saturation, such as a faded and/or dim, monochrome (e.g., greyscale) version of the image. Low-color saturation is not, however, limited to monochrome. Rather, the low-color saturation may include one or more colors with darkened tones or shades such that the perceived colorfulness of the display is muted.

In one aspect, when transitioning from the dormant mode to the ambient mode, additional power is provided to the multi-mode interface to reveal (e.g., fade in) the image for a specified duration of time to greet the user with moderate to high luminosity. In this way, the display informs the user that the device is aware of the user's presence and is prepared to respond to the user's movements. After the duration of time expires, the power may be adjusted to decrease the luminosity such that the image fades into a less prominent state. For example, power consumption may be reduced and the display screen may be darkened to hide the image or provide a dim, desaturated version of the image. In some implementations, the power consumption is further reduced by darkening and/or desaturating one or more of the user-interface elements. In the ambient mode, the device is periodically responsive to the user's movements (e.g., uses a low sample rate for detecting the user's movements). A low sample rate allows the mobile device to maintain low power-consumption.

The radar system can detect threshold movement by an object, such as the user's hand reaching toward the device, within a specified distance of the device (e.g., approximately 1.0 meters, 0.75 meters, 0.5 meters, 0.3 meters, etc.). When the radar system detects this threshold movement, the interaction manager can autonomously transition the multi-mode interface from the ambient mode to the alert mode. In the alert mode, the power provided to the multi-mode interface is dynamically adjustable to increase the luminosity of at least the image as the user reaches toward the device. For example, the luminosity is adjusted in proportion to an amount and/or rate of decrease in the distance between the user's hand and the device such that at least the image progressively becomes more visible as the user's hand approaches the device. In some instances, one or more shapes or objects may come out of the background and/or in from the sides of the display device, progressively growing in size and becoming more visible as the user's hand approaches the device. In aspects, the shapes or objects may move onscreen as the user's hand moves toward the device, such as toward or away from the user's hand, or toward or away from a specified onscreen-location. Another example includes the display screen transitioning from dark or low luminosity, with one or more UI elements displayed in a light color (e.g., white, yellow, orange, etc.), to high brightness with the one or more UI elements displayed in a dark color (e.g., black, brown, navy blue, etc.).

When an authentication system (e.g., radar-based authentication, facial recognition authentication, fingerprint recognition authentication, and so forth) of the mobile device recognizes the user as an authorized user, the interaction manager transitions the multi-mode interface to the active mode. The active mode is a fully operational state of the device and provides full rights to an authenticated user. This is in contrast to the dormant, ambient, and alert modes, which each provide less-than-full rights to the user. In the active mode, the device operates in a higher-power (or active) state in which the user has full access to the device. When transitioning from the alert mode to the active mode (e.g., when the device unlocks based on user recognition and authentication), the device provides additional power to the multi-mode interface to increase the color saturation of at least the displayed image. In this way, color flows into the image to provide visual feedback to the user to indicate that the user is recognized and authenticated and the device is unlocked. In some aspects, the luminosity can be further increased along with the increase in color saturation until reaching an appropriate level of luminosity, such as a preset luminosity level associated with operation of the device in an unlocked state.

Some conventional mobile devices may use cameras or proximity sensors (e.g., capacitive sensors) to determine the location of the user and adjust various functions of the mobile device based on the proximity of the user. For example, the mobile device may provide additional privacy or aesthetic value by turning off a display unless the user is within a predetermined distance. The conventional mobile device, however, typically cannot provide a rich ambient experience to a user that can educate the user that the device is aware of the user's movements and can react in interesting ways, particularly when the user device is in a locked state.

Further, power consumption of the radar system and the mobile device itself can be substantially less than some conventional techniques that may use an always-on camera (or other sensors or combinations of sensors) to control some display features. Less power is consumed when the user is only implicitly or indirectly interacting with the user device, and additional power is provided to the radar system and the multi-mode interface only when the level of indirect user interaction increases. Further, the power consumption is reduced when the level of indirect user interaction decreases. These are but a few examples of how the described techniques and devices may be used to enable a low-power mobile device-based radar system for applying different power modes to a multi-mode interface. Other examples and implementations of which are described throughout this document. The document now turns to an example operating environment, after which example devices, methods, and systems are described.

Operating Environment

FIG. 1 illustrates an example environment 100 in which techniques enabling a mobile device-based radar system for applying different power modes to a multi-mode interface can be implemented. The example environment 100 includes a user device 102 (e.g., electronic device), which includes, or is associated with, a radar system 104, a persistent radar-based interaction manager 106 (interaction manager 106), and, optionally, one or more non-radar sensors 108 (non-radar sensor 108). The non-radar sensor 108 can be any of a variety of devices, such as an audio sensor (e.g., a microphone), a touch-input sensor (e.g., a touch-screen), or an image-capture device (e.g., a camera or video-camera).

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the user device 102, or another electronic device, to sense and analyze reflections from an object (e.g., user 112) in the radar field 110. Some implementations of the radar system 104 are particularly advantageous as applied in the context of smartphones, such as the user device 102, for which there is a convergence of issues such as a need for low power, a need for processing efficiency, limitations in a spacing and layout of antenna elements, and other issues, and are even further advantageous in the particular context of smartphones for which radar detection of fine hand air gestures is desired. Although the embodiments are particularly advantageous in the described context of the smartphone for which fine radar-detected hand air gestures is required, it is to be appreciated that the applicability of the features and advantages of the present invention is not necessarily so limited, and other embodiments involving other types of electronic devices may also be within the scope of the present teachings.

The object may be any of a variety of objects from which the radar system 104 can sense and analyze radar reflections, such as wood, plastic, metal, fabric, a human body, or human body parts (e.g., a foot, hand, or finger of a user of the user device 102). As shown in FIG. 1, the object is a user (e.g., user 112) of the user device 102. Based on the analysis of the reflections, the radar system 104 can provide radar data that includes various types of information associated with the radar field 110 and the reflections from the user 112, as described with reference to FIGS. 3-6 (e.g., the radar system 104 can pass the radar data to other entities, such as the interaction manager 106).

It should be noted that the radar data may be continuously or periodically provided over time, based on the sensed and analyzed reflections from the user 112 in the radar field 110. A position of the user 112 can change over time (e.g., the user 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth.

The interaction manager 106 can be used to interact with or control various components of the user device 102 (e.g., modules, managers, systems, or interfaces). For instance, the interaction manager 106 can interact with, or implement, a multi-mode interface 114. The interaction manager 106 can maintain the multi-mode interface 114 in a particular mode or cause the multi-mode interface 114 to change modes, based on radar data obtained from the radar system 104. These modes are described in further detail below with respect to FIGS. 7-9.

The interaction manager 106 can be used to interact with or control various components of the user device 102 (e.g., modules, managers, systems, or interfaces). For example, the interaction manager 106 can be used to maintain the radar system 104 in an idle mode. The idle mode is a persistent lower-power radar mode that allows the radar system 104 to scan an environment external to the user device 102 and determine a presence of the user 112. The term "persistent," with reference to the interaction manager 106, and to the idle mode of the radar system 104, means that no user interaction is required to maintain the radar system 104 in the idle mode or to activate the interaction manager 106. In some implementations, the "persistent" state may be paused or turned off (e.g., by the user 112). In other implementations, the "persistent" state may be scheduled or otherwise managed in accordance with one or more parameters of the user device 102 (or other electronic device). For example, the user 112 may schedule the "persistent" state such that it is only operational during daylight hours, even though the user device 102 is on both at night and during the day. In another example, the user 112 may coordinate the "persistent" state with a power-saving mode of the user device 102.

In the idle mode, the interaction manager 106 can determine the presence of the user 112 without verbal, touch, or other input by the user. For example, while in the idle mode, the interaction manager 106 may use one or more subsets of the radar data (as described herein), provided by the radar system 104, to determine the presence of the user 112 or of other objects that may be within a range of the radar field 110 of the user device 102. In this way, the interaction manager 106 can provide seamless power management without requiring explicit user input.

In some implementations, the idle mode requires no more than approximately 30 milliwatts (mW) of power. In other implementations, the idle mode may require a different amount of power, such as approximately two mW or approximately eight mW. Further, when the interaction manager 106 is maintaining the radar system 104 in the idle mode, the interaction manager 106 may also maintain the user device 102 in a lower-power state (e.g., a sleep mode or other power-saving mode). In this way, by determining whether the user 112 (or another person) is near the user device 102, the interaction manager can help preserve battery power by reducing power consumption when no user is near the user device 102.

The radar field 110 is an area around the radar system 104 within which the interaction manager 106 can accurately determine the presence of the user 112. The radar field 110 may take any of a variety of shapes and forms. For example, radar field 110 may have a shape as described with reference to FIGS. 3 and 4. In other cases, the radar field 110 may take a shape such as a radius extending from the radar system 104, a volume around the radar system 104 (e.g., a sphere, a hemisphere, a partial sphere, a beam, or a cone), or a non-uniform shape (e.g., to accommodate interference from obstructions in the radar field 110). The radar field 110 may extend any of a variety of distances from the radar system 104 such as three, seven, ten, or fourteen feet (or one, two, three, or four meters). The radar field 110 may be predefined, user-selectable, or determined via another method (e.g., based on power requirements, remaining battery life, or another factor). In some implementations, when the interaction manager 106 determines the presence of the user 112 (or another object) within the radar field 110, the interaction manager 106 can cause the radar system 104 to exit the idle mode and enter an interaction mode, which is described in detail below.

Optionally, or in other implementations, when the interaction manager 106 determines the presence of the user 112 (or another object) within the radar field 110, the interaction manager 106 can cause the radar system 104 to enter an attention mode. The attention mode is a radar mode that allows the radar system 104 to provide other information about objects within the radar field 110. For example, while in the attention mode, the radar system 104 can provide other radar data (including one or more other subsets of the radar data, as described herein) that can be used to determine an implicit interaction by the user 112 with the user device, such as the user 112 reaching a hand toward the user device 102.

In some implementations, the attention mode requires no more than approximately 60 mW of power. In other implementations, the attention mode may require a different amount of power, such as between approximately 8 mW and approximately 55 mW or between approximately 2 mW and approximately 20 mW. When the interaction manager 106 is maintaining the radar system 104 in the attention mode, the interaction manager 106 may also maintain the user device 102 in the lower-power state that may be used with the idle mode, or the interaction manager 106 may cause the user device 102 to exit the lower-power state and enter another state (e.g., a wake mode, an active mode, and so forth).

The interaction manager 106 (or another module or entity) can use the radar data to determine implicit interactions by the user 112 with the user device 102. The implicit interactions level can be determined from a variety of information about the user 112 (within the radar field 110) that can be determined based on the other radar data. The interaction manager 106 can determine the implicit interaction by the user 112 without verbal, touch, or other input by the user. For example, the interaction manager 106 may use the other radar data, or one or more other subsets of the other radar data, to determine a body position or posture of the user 112 in relation to the user device 102.

The determination of the body position and posture of the user 112 may include determining one or more of a variety of different nonverbal body language cues, body positions, or body postures. The cues, positions and postures may include an absolute position or distance of the user 112 with reference to the user device 102, a change in the position or distance of the user 112 with reference to the user device 102 (e.g., whether the user 112 (or the user's hand or object held by the user 112) is moving closer to or farther from the user device 102), the velocity of the user 112 (or hand or object) when moving toward or away from the user device 102, whether the user 112 turns toward or away from the user device 102, whether the user 112 leans toward, waves toward, reaches for, or points at the user device 102, and so forth.

In some implementations, the interaction mode requires no more than approximately 90 mW of power. In other implementations, the interaction mode may require a different amount of power, such as approximately 20 mW or approximately 55 mW. Further, when the interaction manager 106 maintains the radar system 104 in the interaction mode, while the user 112 interacts with the user device 102, the interaction manager 106 may also maintain the user device 102 in an appropriate power state (e.g., a full-power state, the wake mode or active mode as described with reference to the attention mode, the sleep state as described with reference to the idle mode, or another power state). In this way, by determining implicit interactions by the user 112 (or another person) with the user device 102, the interaction manager can help preserve battery power by inducing an appropriate radar-power state for the radar system 104, and optionally for the user device 102, that is appropriate to the level of interaction by the user 112.

The power consumed by the radar system 104 in the idle mode, the attention mode, and the interaction mode can be adjusted using various techniques. For example, the radar system 104 can reduce power consumption by collecting radar data at different duty cycles (e.g., lower frequencies may use less power and higher frequencies may use more power), turning various components off when the components are not active, or adjusting a power amplification level. Additional details regarding power management of the radar system 104 (and the user device 102) are described with reference to FIG. 3-1.

The user device 102 can also include a display device, such as display 116. The display 116 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth. The display 116 is used to display the multi-mode interface 114 in any of its various modes.

The radar-based interaction manager 106 can determine movements made by the user or the user's hand based on radar data provided by the radar system 104. The interaction manager 106 then processes the movements in a way that enables the user to implicitly interact with the user device 102 via the movements. For example, as described with reference to FIGS. 3-6, the radar system can use the radar field to sense and analyze reflections from objects in the radar field in ways that enable high resolution and accuracy for movement recognition of the user.

Some implementations of the radar system 104 are particularly advantageous as applied in the context of smart devices (e.g., user device 102), for which there is a convergence of issues. This can include a need for limitations in a spacing and layout of the radar system 104 and low power. Exemplary overall lateral dimensions of the smart device can be, for example, approximately eight centimeters by approximately fifteen centimeters. Exemplary footprints of the radar system can be even more limited, such as approximately four millimeters by six millimeters with antennas included. Exemplary power consumption of the radar system 104 may be on the order of a few milliwatts to tens of milliwatts (e.g., between approximately two milliwatts and twenty milliwatts). The requirement of such a limited footprint and power consumption for the radar system 104 enables the smart device to include other desirable features in a space-limited package (e.g., a camera sensor, a fingerprint sensor, a display, and so forth).

Exemplary overall lateral dimensions of the smart device can be, for example, approximately eight centimeters by approximately fifteen centimeters. Exemplary footprints of the radar system 104 can be even more limited, such as approximately four millimeters by six millimeters with antennas included. Exemplary power consumption of the radar system 104 may be on the order of a few milliwatts to several milliwatts (e.g., between approximately two milliwatts and twenty milliwatts). The requirement of such a limited footprint and power consumption for the radar system 104, enables the smart device to include other desirable features in such a space-limited package (e.g., a camera sensor, a fingerprint sensor, a display, and so forth). The smart device and the radar system 104 are further described with respect to FIG. 2.

Figure 2:
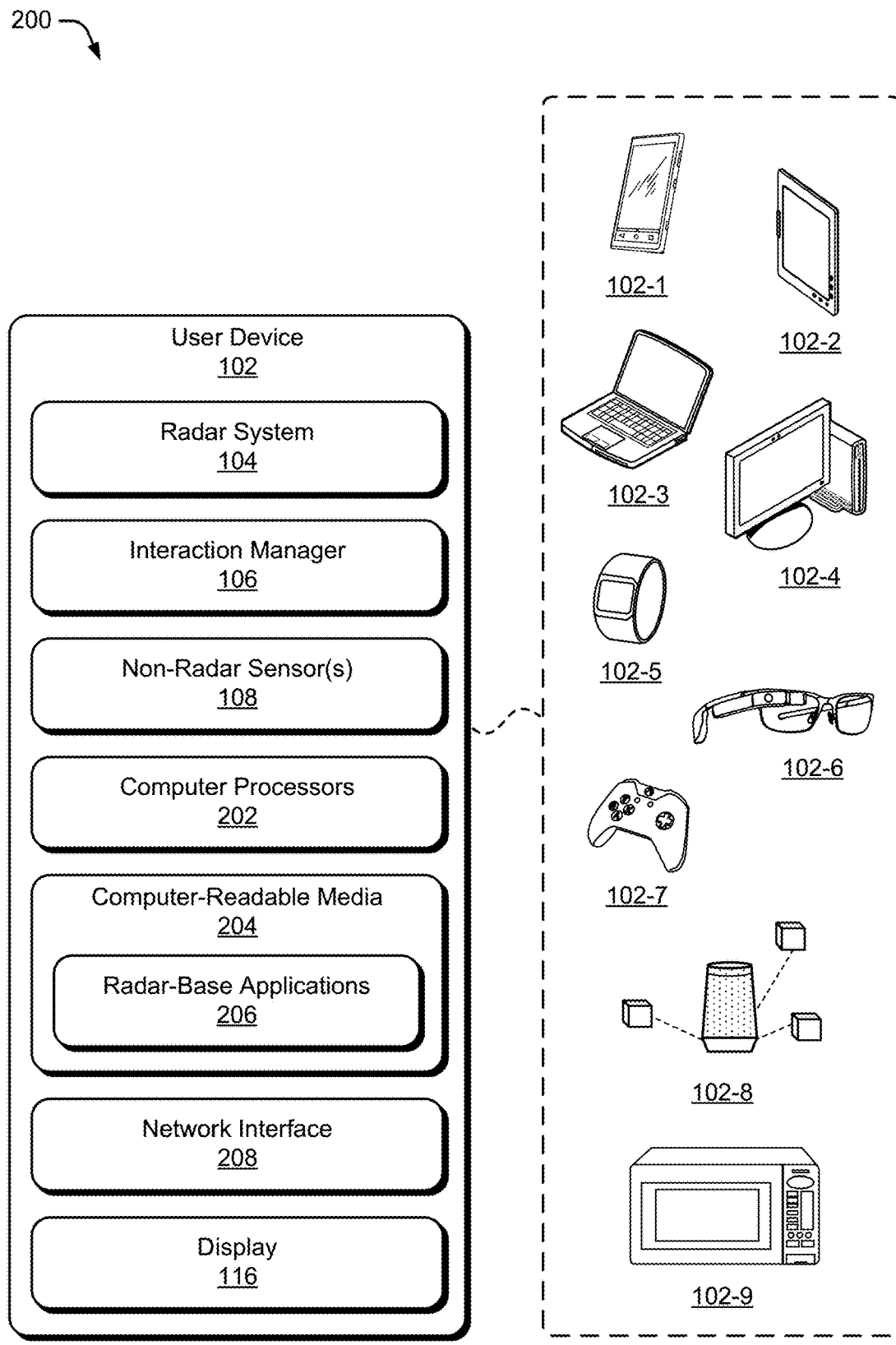
FIG. 2 illustrates an example implementation of the mobile device of FIG. 1 that includes a radar system and can apply various power modes to the multi-mode interface.

In more detail, consider FIG. 2, which illustrates an example implementation 200 of the user device 102 (including the radar system 104, the interaction manager 106, and the non-radar sensor 108) that can implement a mobile device-based radar system for applying different power modes to a multi-mode interface. The user device 102 of FIG. 2 is illustrated with a variety of example devices, including a user device 102-1, a tablet 102-2, a laptop 102-3, a desktop computer 102-4, a computing watch 102-5, computing spectacles 102-6, a gaming system 102-7, a home-automation and control system 102-8, and a microwave 102-9. The user device 102 can also include other devices, such as televisions, entertainment systems, audio systems, automobiles, drones, track pads, drawing pads, netbooks, e-readers, home security systems, and other home appliances. Note that the user device 102 can be wearable, non-wearable but mobile, or relatively immobile (e.g., desktops and appliances).

Exemplary overall lateral dimensions of the user device 102 can be, for example, approximately eight centimeters by approximately fifteen centimeters. Exemplary footprints of the radar system 104 can be even more limited, such as approximately four millimeters by six millimeters with antennas included. The requirement of such a limited footprint for the radar system 104, which is needed to accommodate the many other desirable features of the user device 102 in such a space-limited package (e.g., a fingerprint sensor, the non-radar sensor 108, and so forth) combined with power and processing limitations, can lead to compromises in the accuracy and efficacy of radar gesture detection, at least some of which can be overcome in view of the teachings herein.

The user device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. The computer-readable media 204 also includes a radar-based application 206, which uses radar data generated by the radar system 104 to perform a function, such as detect a presence of a user or track the user's air gestures for touch-free control.

The user device 102 may also include a network interface 208. The user device 102 can use the network interface 208 for communicating data over wired, wireless, or optical networks. By way of example and not limitation, the network interface 208 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

In aspects, the radar system 104 is implemented at least partially in hardware. Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multistatic radar, or a network radar. Constraints or limitations of the user device 102, however, may impact a design of the radar system 104. The user device 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 and the interaction manager 106 are illustrated as part of the user device 102. In other implementations, either or both of the radar system 104 and the interaction manager 106 may be separate or remote from the user device 102.

Figures 1, 3:
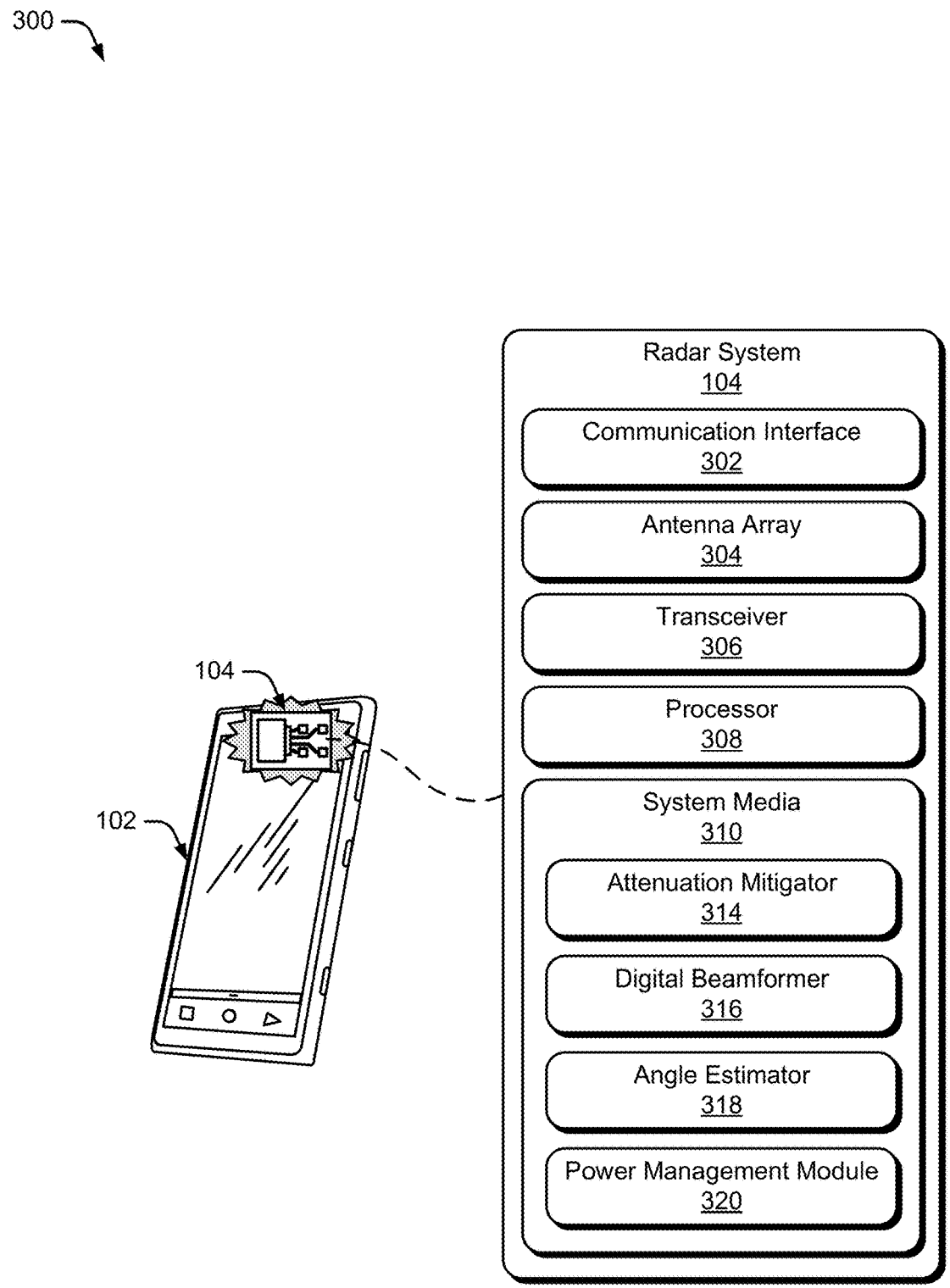
Figure 3:
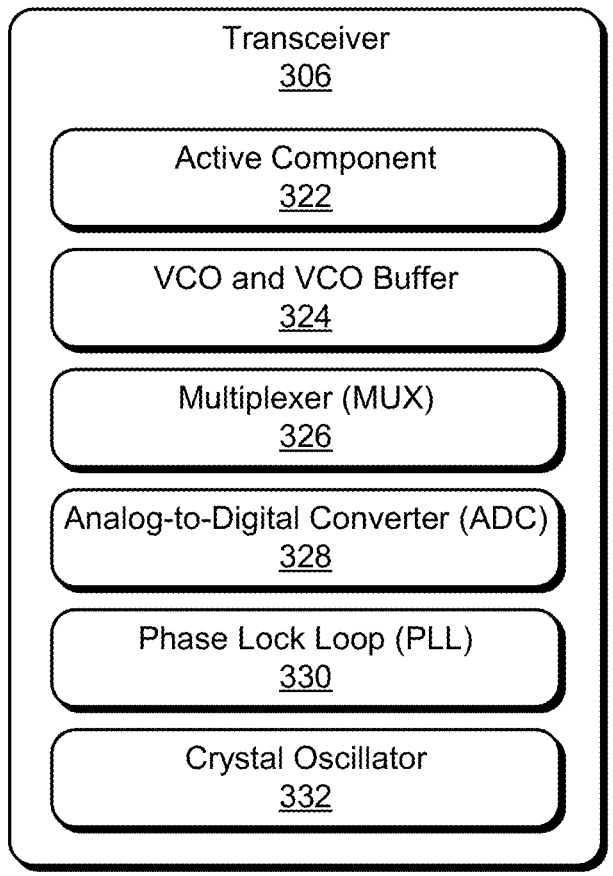
Figure 2:
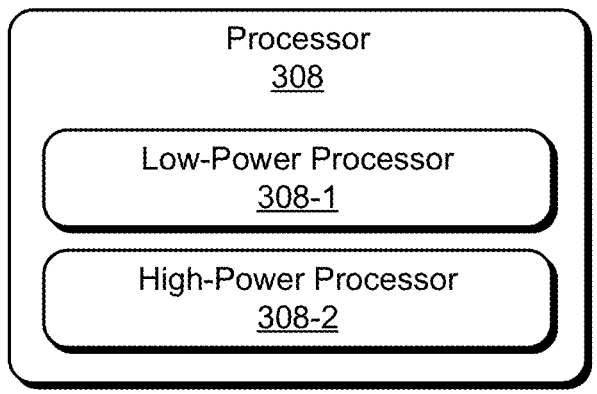

FIG. 3-2 illustrates an example transceiver 306 and processor 308. The transceiver 306 includes multiple components that can be individually turned on or off via the power management module 320 in accordance with an operational state of the radar system 104. The transceiver 306 is shown to include at least one of each of the following components: an active component 322, a voltage-controlled oscillator (VCO) and voltage-controlled buffer 324, a multiplexer 326, an analog-to-digital converter (ADC) 328, a phase lock loop (PLL) 330, and a crystal oscillator 332. If turned on, each of these components consume power, even if the radar system 104 is not actively using these components to transmit or receive radar signals. The active component 322, for example, can include an amplifier or filter that is coupled to a supply voltage. The voltage-controlled oscillator 324 generates a frequency-modulated radar signal based on a control voltage that is provided by the phase lock loop 330. The crystal oscillator 332 generates a reference signal for signal generation, frequency conversion (e.g., upconversion or downconversion), or timing operations within the radar system 104. By turning these components on or off, the power management module 320 enables the radar system 104 to quickly switch between active and inactive operational states and conserve power during various inactive time periods. These inactive time periods may be on the order of microseconds (µs), milliseconds (ms), or seconds (s).

The processor 308 is shown to include multiple processors that consume different amounts of power, such as a low-power processor 308-1 and a high-power processor 308-2. As an example, the low-power processor 308-1 can include a processor that is embedded within the radar system 104 and the high-power processor can include the computer processor 202 or some other processor that is external to the radar system 104. The differences in power consumption can result from different amounts of available memory or computational ability. For instance, the low-power processor 308-1 may utilize less memory, perform fewer computations, or utilize simpler algorithms relative to the high-power processor 308-2. Despite these limitations, the low-power processor 308-1 can process data for less complex radar-based applications 206, such as proximity detection or motion detection. The high-power processor 308-2, in contrast, may utilize a large amount of memory, perform a large amount of computations, or execute complex signal processing, tracking, or machine learning algorithms. The high-power processor 308-2 may process data for high-profile radar-based applications 206, such as air gesture recognition, and provide accurate, high-resolution data through the resolution of angular ambiguities or distinguishing of multiple users 112.

To conserve power, the power management module 320 can control whether the low-power processor 308-1 or the high-power processor 308-2 are used to process the radar data. In some cases, the low-power processor 308-1 can perform a portion of the analysis and pass data onto the high-power processor 308-2. Example data may include a clutter map, raw or minimally processed radar data (e.g., in-phase and quadrature data or range-Doppler data), or digital beamforming data. The low-power processor 308-1 may also perform some low-level analysis to determine whether there is anything of interest in the environment for the high-power processor 308-2 to analyze. In this way, power can be conserved by limiting operation of the high-power processor 308-2 while utilizing the high-power processor 308-2 for situations in which high-fidelity or accurate radar data is requested by the radar-based application 206. Other factors that can impact power consumption within the radar system 104 are further described with respect to FIG. 3-1.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 15 illustrate some of many possible environments and devices capable of employing the described techniques. FIGS. 3-6 describe additional details and features of the radar system 104. In FIGS. 3-6, the radar system 104 is described in the context of the user device 102, but as noted above, the applicability of the features and advantages of the described systems and techniques are not necessarily so limited, and other embodiments involving other types of electronic devices may also be within the scope of the present teachings.

FIG. 3-1 illustrates an example implementation 300 of the radar system 104 that can be used to enable and control different power modes of a multi-mode interface. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the user device 102) or some combination thereof. The system media 310, which may be included within, or be separate from, the computer-readable media 204 of the user device 102, includes one or more of the following modules: an attenuation mitigator 314, a digital beamformer 316, an angle estimator 318, or a power management module 320. These modules can compensate for, or mitigate the effects of, integrating the radar system 104 within the user device 102, thereby enabling the radar system 104 to recognize small or complex air gestures, distinguish between different orientations of the user, continuously monitor an external environment, or realize a target false-alarm rate. With these features, the radar system 104 can be implemented within a variety of different devices, such as the devices illustrated in FIG. 2.

Using the communication interface 302, the radar system 104 can provide radar data to the interaction manager 106. The communication interface 302 may be a wireless or wired interface based on the radar system 104 being implemented separate from, or integrated within, the user device 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the interaction manager 106 for a mobile device-based radar system for applying different power modes to a multi-mode interface.

Figure 4:
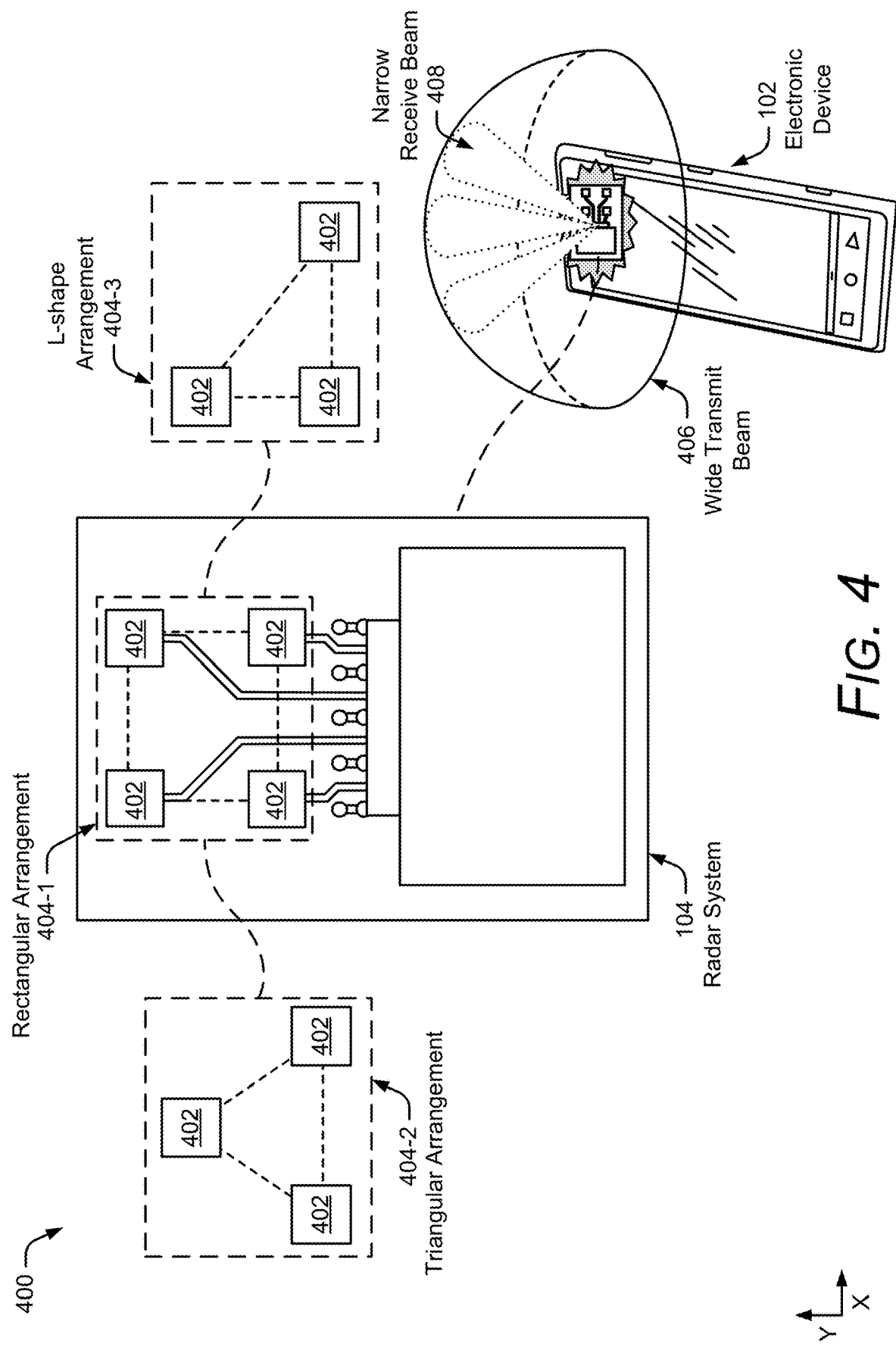
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the user device 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

A power management module 320 enables the radar system 104 to conserve power internally or externally within the user device 102. In some implementations, the power management module 320 communicates with the interaction manager 106 to conserve power within either or both of the radar system 104 or the user device 102. Internally, for example, the power management module 320 can cause the radar system 104 to collect data using a predefined radar-power state or a specific duty cycle (e.g., a lower duty cycle uses a slower update rate and a higher duty cycle uses a faster update rate). In this case, the power management module 320 dynamically switches between different radar-power states such that response delay and power consumption are managed together based on the activity within the environment. In general, the power management module 320 determines when and how power can be conserved, and incrementally adjusts power consumption to enable the radar system 104 to operate within power limitations of the user device 102. In some cases, the power management module 320 may monitor an amount of available power remaining and adjust operations of the radar system 104 accordingly. For example, if the remaining amount of power is low, the power management module 320 may continue operating in a lower-power mode instead of switching to a higher-power mode.

The low-power mode, for example, may use a low duty cycle on the order of a few hertz (e.g., approximately 1 Hz or less than 5 Hz), which reduces power consumption to a few milliwatts (mW) (e.g., between approximately 2 mW and 5 mW). The high-power mode, on the other hand, may use a high duty cycle on the order of tens of hertz (Hz) (e.g., approximately 20 Hz or greater than 10 Hz), which causes the radar system 104 to consume power on the order of several milliwatts (e.g., between approximately 8 mW and 20 mW). While the low-power mode can be used to monitor the external environment or detect an approaching user, the power management module 320 may switch to the high-power mode if the radar system 104 determines the user is starting to perform an air gesture. Different triggers may cause the power management module 320 to switch between the different radar-power states. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the electronic device 102 or a preference to collect data using a longer response delay may cause a lower-power mode to be activated to conserve power.

The power management module 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Further, the power management module 320 can modify transmission power of the radar signals by adjusting an amount of amplification provided by a signal amplifier. Additionally, the power management module 320 can control the use of different hardware components within the radar system 104 to conserve power. If the processor 308 comprises a lower-power processor and a higher-power processor (e.g., processors with different amounts of memory and computational capability), for example, the power management module 320 can switch between utilizing the lower-power processor for low-level analysis (e.g., implementing the idle mode, detecting motion, determining a location of a user, or monitoring the environment) and the higher-power processor for situations in which high-fidelity or accurate radar data is requested by the interaction manager 106 (e.g., for implementing the attention mode or the interaction mode, air gesture recognition or user orientation).

In addition to the internal power-saving techniques described above, the power management module 320 can also conserve power within the electronic device 102 by activating or deactivating other external components or sensors that are within the electronic device 102. These external components may include speakers, a camera sensor, a global positioning system, a wireless communication transceiver, a display, a gyroscope, or an accelerometer. Because the radar system 104 can monitor the environment using a small amount of power, the power management module 320 can appropriately turn these external components on or off based on where the user is located or what the user is doing. In this way, the electronic device 102 can seamlessly respond to the user and conserve power without the use of automatic shut-off timers or the user physically touching or verbally controlling the electronic device 102.

Figure 5:
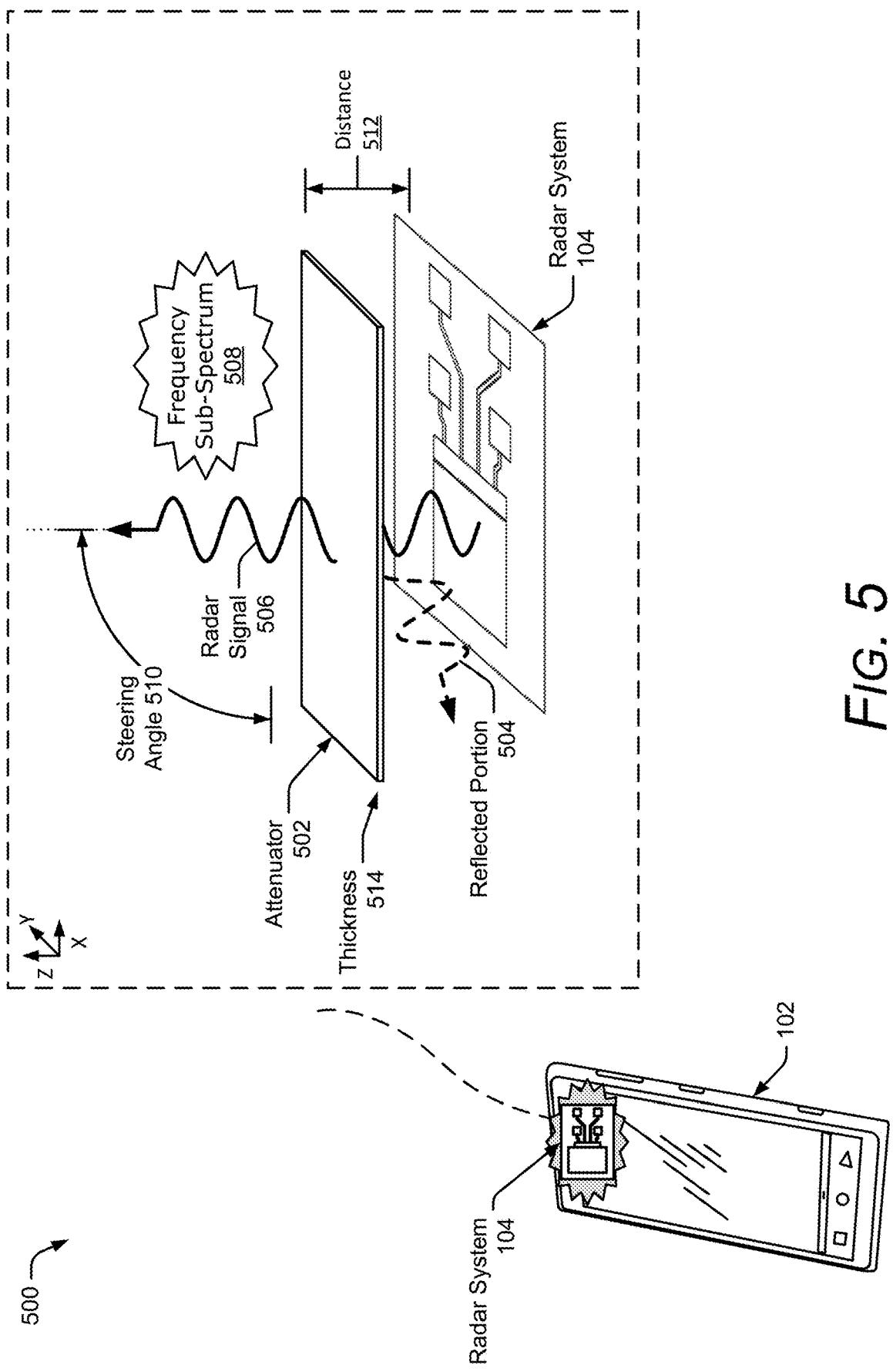
FIG. 5 illustrates additional details of an example implementation of the radar system of FIG. 2.

FIG. 5 illustrates additional details of an example implementation 500 of the radar system 104 within the user device 102. In the example 500, the antenna array 304 is positioned underneath an exterior housing of the user device 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the user device 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the user device 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
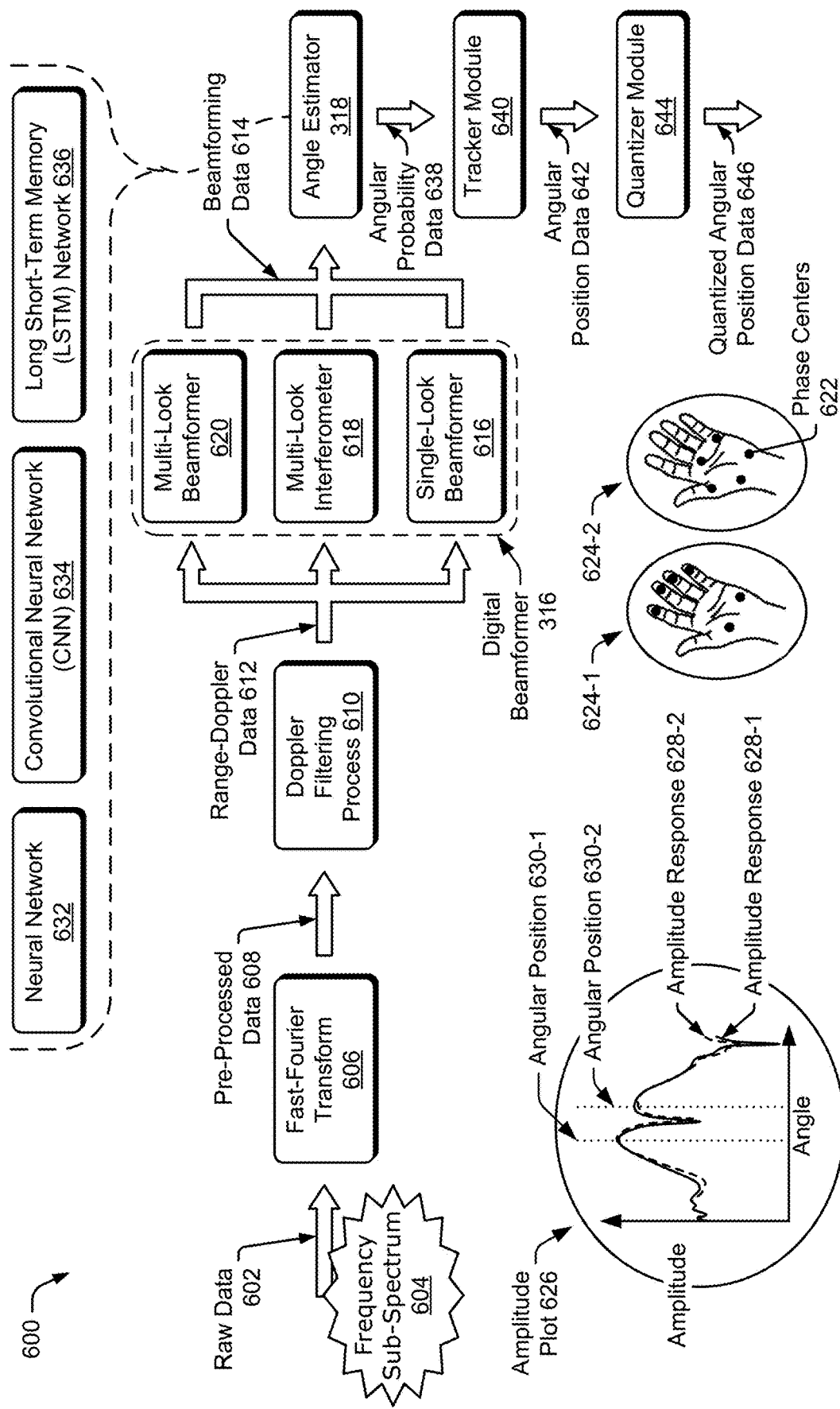
FIG. 6 illustrates an example scheme that can be implemented by the radar system of FIG. 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications (e.g., the interaction manager 106), and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small air gestures or distinguish between multiple portions of the user.

The angle estimator 318 analyzes the beamforming data 614 to estimate one or more angular positions. The angle estimator 318 may utilize signal processing techniques, pattern matching techniques, or machine learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to the target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of user device 102 (e.g., computational capability or power constraints) or a target angular resolution for the interaction manager 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the user device 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the interaction manager 106. In some situations, fewer quantization levels can be used such that the quantized angular position data 646 indicates whether the target is to the right or to the left of the user device 102 or identifies a 90-degree quadrant the target is located within. This may be sufficient for some radar-based applications, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications, such as air gesture recognition, or in implementations of the attention mode or the interaction mode as described herein. In some implementations, the digital beamformer 316, the angle estimator 318, the tracker module 640, and the quantizer module 644 are together implemented in a single machine learning module.

Figure 7:
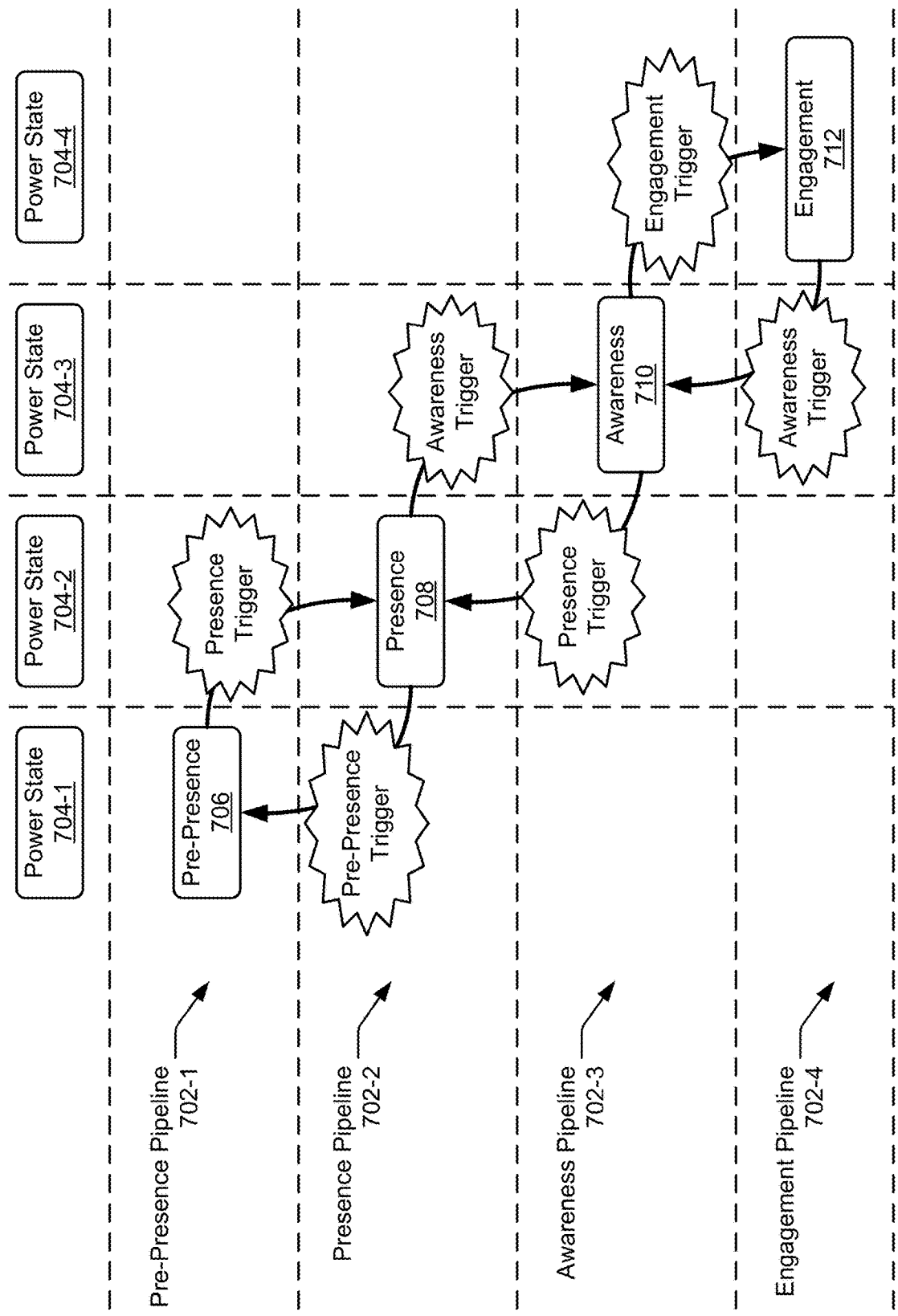
FIG. 7 illustrates example radar pipelines.

FIG. 7 illustrates four example radar pipelines 702-1, 702-2, 702-3, and 702-4. Each of the radar pipelines 702 perform radar operations associated with respective radar-power states 704-1, 704-2, 704-3, and 704-4. The pre-presence pipeline 702-1, for example, is employed if a presence of the user 112 is not known for certain. The pre-presence pipeline 702-1 can monitor the environment and determine whether the user device 102 moves or whether there is motion within the environment, which may indicate a presence of the user 112. The presence pipeline 702-2 is used to confidently determine a presence of the user 112. If the user 112 moves closer to the radar system 104 or performs some sort of motion that is advantageous to monitor using a higher duty cycle (e.g., fast update rate), the awareness pipeline 702-3 is activated. The awareness pipeline 702-3 may track the user 112 and monitor a distance between the user 112 and the user device 102. Likewise, the engagement pipeline 702-4 is employed to collect radar data at a highest duty cycle, which may support advanced radar techniques such as air gesture recognition. While the engagement pipeline 702-4 consumes more power than the other radar pipelines 702, the higher power consumption enables small or fast motions of the user 112 to be recognized, which the other radar pipelines 702 may be unable to confidently or accurately evaluate.

Each of the radar pipelines 702-1, 702-2, 702-3, and 702-4 employ a respective radar operation, such as a pre-presence operation 706, a presence operation 708, an awareness operation 710, and an engagement operation 712. Each of these radar operations may utilize a particular duty cycle, framing structure, transmit power, or hardware according to the radar-power state 704. In general, the radar operations monitor the environment and detect triggers that activate a lower-power or a higher-power radar pipeline 702. Although not shown, the radar operations may utilize more than one radar-power state 704 to monitor the environment and detect a trigger. Example triggers include motion or the lack of motion, appearance or disappearance of a user, a user moving into or out of a designated region (e.g., a region defined by range, azimuth, or elevation), a change in velocity of a motion associated with the user, or a change in reflected signal strength (e.g., due to changes in radar cross section). In general, the triggers that indicate a higher probability of a user (e.g., the user 112) interacting with the user device 102 or a preference for a shorter response delay may cause a higher-power radar pipeline 702 to be activated.

The duty cycle represents how often the radar system 104 is active (e.g., actively transmitting or receiving radar signals). The framing structure specifies a configuration, scheduling, and signal characteristics associated with the transmission and reception of the radar signals. In general, the framing structure is set up such that the appropriate radar data can be collected based on the external environment. The framing structure can be customized to facilitate collection of different types of radar data for different applications (e.g., proximity detection, feature recognition, or air gesture recognition). Based on the framing structure, the power management module 320 can turn off the components within the transceiver 306 in FIGS. 3-1 and 3-2 to conserve power.

The radar-power state 704 can also be associated with a transmit power, which can vary based on a range or distance that the radar system 104 is monitoring. If the user 112 is farther from the computing device 102, for example, a higher transmit power may be used to detect the user 112. Alternatively, if the user 112 is closer to the computing device 102, a lower transmit power may be used to conserve power. The hardware can include components whose power consumption can be individually controlled (e.g., the components of the transceiver 306 in FIGS. 3-1 and 3-2) or components that consume different amounts of power during operation (e.g., the low-power processor 308-1 and the high-power processor 308-2 in FIG. 3-2).

Figure 8:
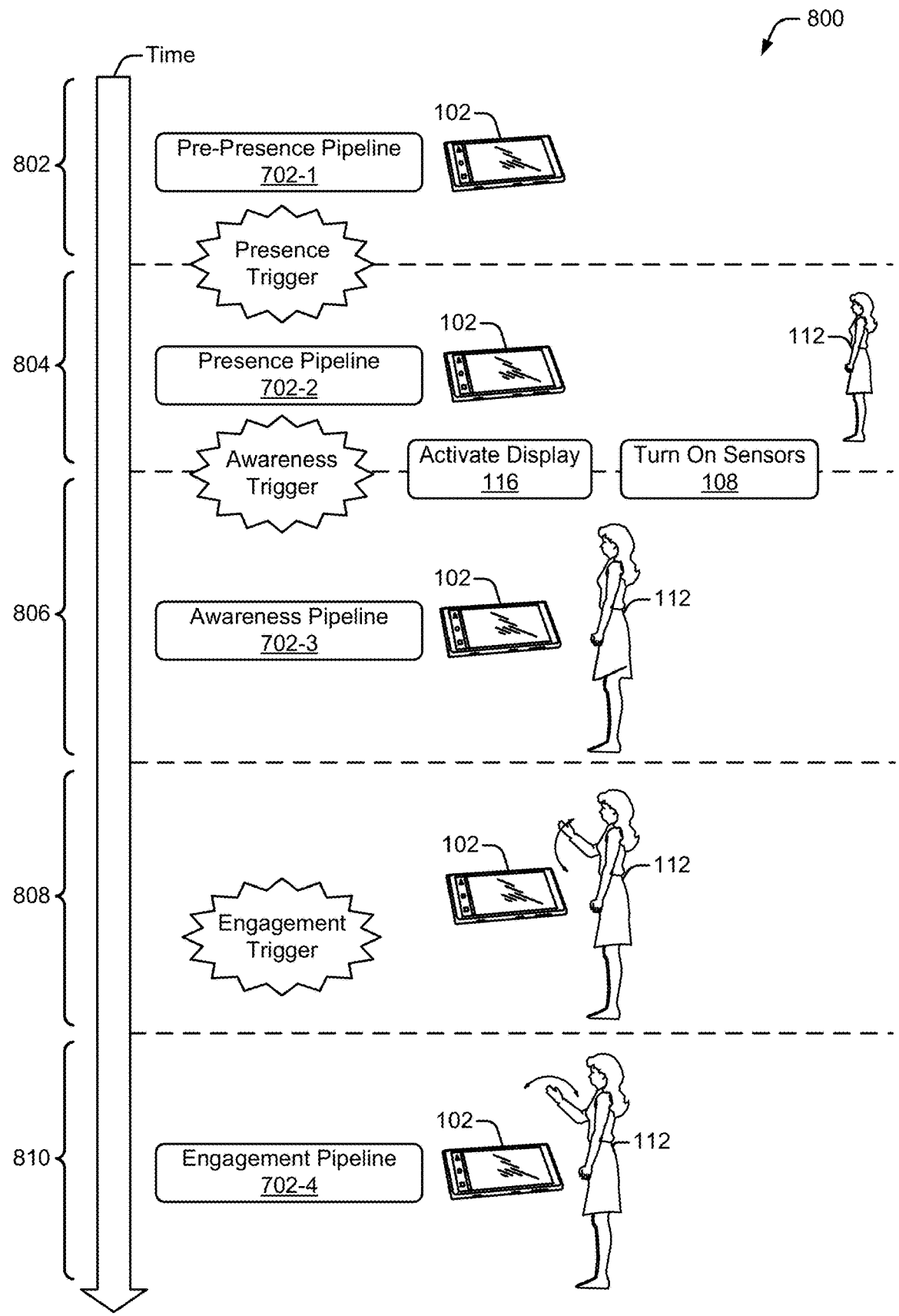
FIG. 8 illustrates an example sequence flow diagram for triggering different radar pipelines.

FIG. 8 illustrates an example sequence flow diagram 800 for triggering different radar pipelines 702, with time elapsing in a downward direction. At 802, the user 112 is not present or is outside a detectable range. For example, the user 112 may be on the order of several meters (m) from the user device 102 (e.g., at distances greater than 2 m). Therefore, the pre-presence pipeline 702-1 is employed to conserve power via a low duty cycle associated with the radar-power state 704-1 (e.g., idle mode). The pre-presence pipeline 702-1 may also utilize the low-power processor 308-1 to monitor the environment and detect motion, which may be indicative of a presence of the user 112.

At 804, the user 112 approaches the user device 102 and the pre-presence pipeline 702-1 triggers the presence pipeline 702-2 to confirm a presence of the user 112. As an example, the user 112 may be within a few meters from the user device 102 (e.g., between approximately 1 and 2 m). The presence pipeline 702-2 uses a medium-low duty cycle associated with the radar-power state 704-2 (e.g., attention mode). As the user 112 moves around in the environment, if the user 112 comes within a specified range to the user device 102, the presence pipeline 702-2 triggers the awareness pipeline 702-3. For example, the awareness pipeline 702-3 may be triggered if the user 112 comes within a close distance, such as within a meter, from the user device 102. Due to a proximity of the user 112, the presence pipeline 702-2 may also activate the display 116 on the user device 102 or turn on other non-radar sensors 108 that may be utilized by the user device 102. A camera sensor, for example, may be activated for capturing an image of the user 112. In other examples, a gyroscope or an accelerometer may be activated to determine an orientation of the user device 102 or speakers may be activated to provide an audible tone if the user 112 has a missed call or a new communication (e.g., a text message) is available.

At 806, the awareness pipeline 702-3 tracks and monitors a location or motion of at least one appendage of the user 112 using a medium-high duty cycle associated with the radar-power state 704-3 (e.g., attention mode). Although the user 112 is near the user device 102, the user 112 may be relatively motionless or performing other tasks that are not associated with the user device 102. Thus, the medium-high duty cycle enables the radar system 104 to conserve power while enabling the radar system 104 to detect changes that may be indicative of the user 112 preparing to interact with the user device 102. At 808, the user 112 raises a hand. The awareness pipeline 702-3 determines that this motion is indicative of the user 112 moving the hand in position to make an air gesture, such as by reaching toward the user device 102. Therefore, the engagement trigger activates the engagement pipeline 702-4. This motion may also cause a portion of the user 112 to come within a closer distance, such as within several centimeters (cm) from the user device 102 (e.g., within approximately 50 cm). This proximity may be another engagement trigger that activates the engagement pipeline 702-4.

At 810, the engagement pipeline 702-4 collects the radar data at a high duty cycle associated with the radar-power state 704-4 (e.g., interaction mode). This duty cycle enables the radar system 104 to recognize the air gesture, which can be used to control the user device 102 via the radar-based application 206. Although the radar pipelines 702 are shown in a cascaded form in FIG. 7 or sequentially activated in FIG. 8, some of the radar pipelines 702 can operate in parallel.

These and other capabilities and configurations, as well as ways in which entities of FIG. 1-8 act and interact, are set forth below. The described entities may be further divided, combined, used along with other sensors or components, and so on. In this way, different implementations of the user device 102, with different configurations of the radar system 104 and non-radar sensors, can be used to implement a mobile device-based radar system for applying different power modes to a multi-mode interface. The example operating environment 100 of FIG. 1 and the detailed illustrations of FIGS. 2-8 illustrate but some of many possible environments and devices capable of employing the described techniques.

Example Devices

Figure 9:
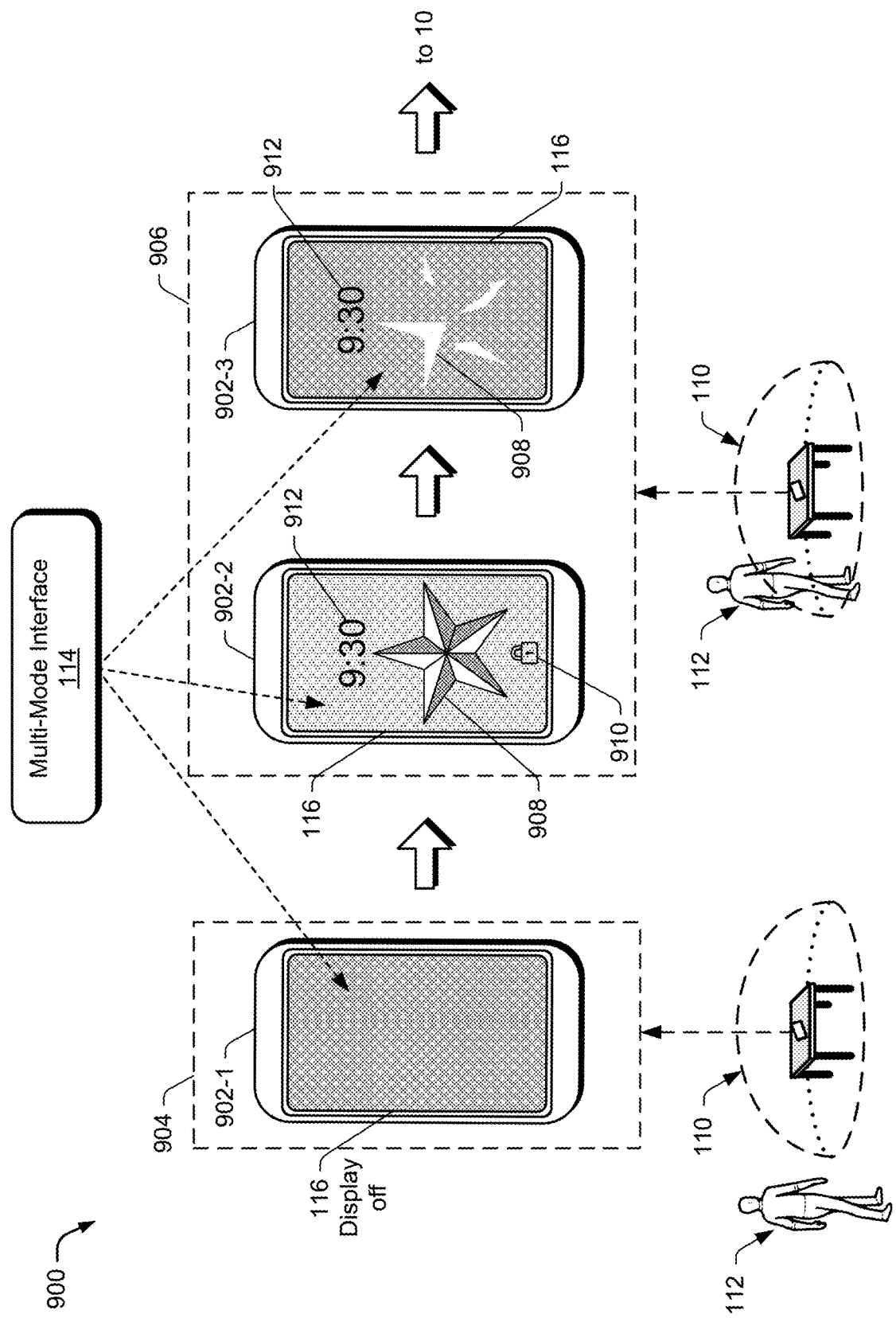
FIGS. 9 and 10 illustrate example implementations of different power modes of a multi-mode interface based on a level of indirect interaction by a user with a mobile device.
Figure 10:
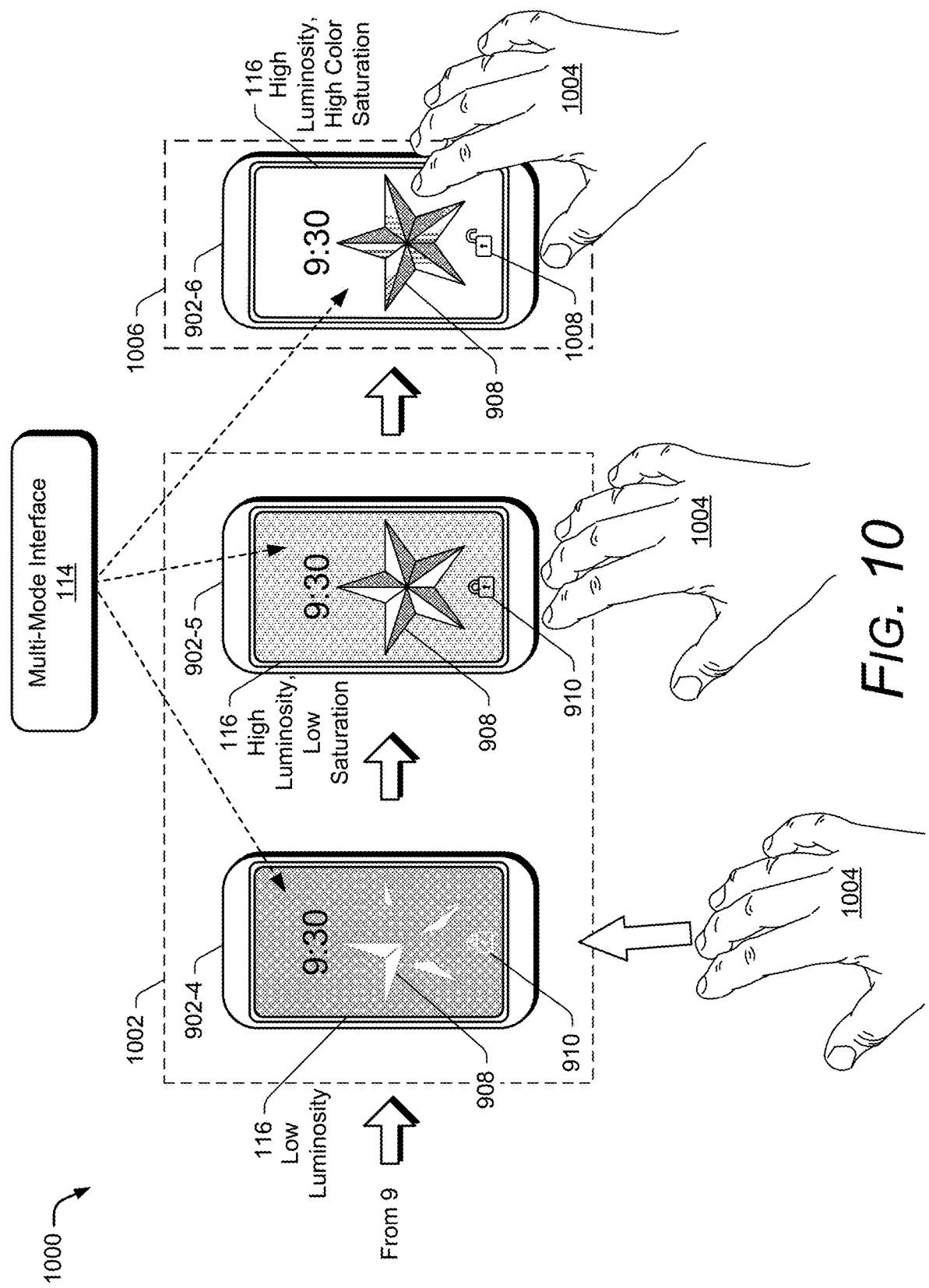

As noted, the techniques and systems described herein can also enable the user device 102 to provide functionality based on a user's implicit interactions with the device. FIGS. 9 and 10 illustrate example implementations 900 and 1000 of a multi-mode interface that changes modes based on radar data indicating a user's implicit interactions with a mobile device. The example implementations 900 and 1000 illustrate a user device 902 (e.g., the user device 102) in different instances 902-1, 902-2, 902-3, 902-4, 902-5, and 902-6. When the user 112 is not detected within the radar field 110, the multi-mode interface 114 operates in a dormant mode 904. In the dormant mode 904, the multi-mode interface 114 is dormant such that no image(s) or object(s) are displayed via the display 116 of the user device 902-1. In addition, the display 116 may be in an off state and the radar system 104 from FIG. 1 may be in an idle mode. These modes and states are low-power operational modes and states.

When the user 112 enters the radar field 110, the radar system 104 detects the user 112 based on reflected radar signals from the user 112. The interaction manager 106 uses this radar data to determine the presence of the user 112 within the radar field 110. In response to detecting the presence of the user 112, the interaction manager 106 causes the multi-mode interface 114 to change modes. In this instance, the multi-mode interface 114 exits the dormant mode 904 and enters an ambient mode 906. When the multi-mode interface 114 enters the ambient mode 906, default or predefined display parameters (e.g., luminosity, color saturation) may be applied for a short duration of time (e.g., 0.5 seconds, 1.0 second, 1.25 seconds, 1.5 seconds, 2.0 seconds, and so on) such that the display screen lights up with moderate to high luminosity, revealing (e.g., fading in) the image for a specified duration of time to greet the user. In this way, the display informs the user that the device is aware of the user's presence and is prepared to respond to the user's movements. After the duration of time expires, the luminosity may decrease such that the image fades into a less prominent state. For example, the display screen may be darkened to hide the image or provide a dim, desaturated version of the image so as to reduce power consumption. In some implementations, one or more of the user-interface elements may also be darkened and/or desaturated to reduce power consumption. In the ambient mode, the device is periodically responsive to the user's movements (e.g., uses a low sample rate for detecting the user's movements). A low sample rate allows the mobile device to maintain low power-consumption In FIG. 9, one or more objects and/or images, including an image 908 of a star and a lock icon 910 are presented with partial or full luminosity for the duration of time. A background of the multi-mode interface 114 may also be provided at a default or predefined luminosity and color saturation. Other elements may also be included, such as a clock element 912 (showing time and/or calendar date) or other items (not shown) including a notification item (e.g., icon, badge, banner, etc.), an access tool to a particular application such as a camera application, and so forth.

In response to expiration of the duration of time, the interaction manager 106 adjusts one or more display parameters (e.g., luminosity, color saturation) to darken the multi-mode interface 114, which reduces power consumption. This is based on the user device 902 not detecting any explicit interaction by the user 112 with the user device 902. In this darkened state of the ambient mode of the multi-mode interface 114, displayed objects and images may be maintained at a low luminosity and zero or low color-saturation (e.g., black and white, grayscale). As shown in the user device 902-3, for example, the clock element 912 remains displayed while the lock icon 910 is removed. The lock icon 910 (or any other element), however, may remain displayed. The background of the multi-mode interface 114 is darkened as part of the decreased luminosity. Further, the image 908 is faded to a low-luminosity version (including low brightness, zero or low saturation, high or low contrast, or any combination thereof). Optionally, the image 908 may be sufficiently darkened so as to not be visible by the user 112. The multi-mode interface 114 may remain in the ambient mode 906 while the user 112 is present within the radar field 110 and not explicitly interacting with the user device 902, either by touch gestures or air gestures. Rather, the user's presence is considered to be an implicit interaction because the user is not actively interacting with the user device 902 to enter user input.

Continuing to FIG. 10, when the user 112 reaches toward the user device 902 while in the ambient mode 906, the interaction manager 106 causes the multi-mode interface to exit the ambient mode 906 and enter an alert mode 1002. As the user's hand 1004 moves toward the user device 902, the interaction manager 106 adjusts one or more parameters, such as luminosity, of the multi-mode interface 114. The rate of adjustment of these parameters may be based on various factors associated with the user's hand 1004 and its movement, including the distance between the user's hand 1004 and the user device 902, the speed at which that distance decreases, and/or the position of the user's hand 1004 relative to the user device 902. In the alert mode 1002, the multi-mode interface 114 provides continuously responsive visual feedback corresponding to the movements of the user's hand 1004.

In the illustrated example, only highly luminous portions of the image 908 are visible in the multi-mode interface 114 when the user's hand 1004 begins to reach toward the user device 902-4. A dim version of the lock icon 910 is also maintained on the multi-mode interface 114. As the user's hand 1004 gets closer to the user device 902 (e.g., 902-5), the image 908 is gradually revealed based on luminosity or other display parameters. Various portions of the image 908 (and other objects such as the lock icon 910) become more and more visible and luminous. The rate at which this occurs may be directly proportional to the rate of decrease in the distance between the user's hand 1004 and the user device 902 (e.g., how quickly the user's hand 1004 moves toward the user device 902 while the radar system is in the awareness pipeline and/or the multi-mode interface 114 is in the alert mode 1002). In aspects, the image 908 remains in a desaturated state (e.g., grayscale) and more tones (e.g., shades of gray) are applied to the image 908 as the user's hand 1004 moves closer to the user device 902-5. Optionally, one or more parameters may also be adjusted to brighten the background of the multi-mode interface 114. However, the alert mode 1002 of the multi-mode interface 114 is associated with a low-power operational state of the user device 902, so maintaining a dark background may help minimize power consumption when increasing the luminosity and/or other display parameters of the multi-mode interface 114.

If, at this point, the user 112 moves their hand 1004 away from the user device 902-5, the interaction manager 106 applies the above-described effects in reverse, such that the image 908 is gradually darkened (e.g., luminosity is gradually decreased) to return the multi-mode interface 114 to the darkened state of the alert mode 1002 (shown at user device 902-4). If the distance between the user's hand 1004 and the user device 902 becomes greater than a threshold distance, the interaction manager 106 may cause the multi-mode interface 114 to exit the alert mode 1002 and re-enter the ambient mode 906.

In this way, the multi-mode interface 114 provides continuously-responsive visual feedback corresponding positional information and the movements of the user's hand 1004 as the user 112 reaches toward (or away from) the user device 902. This continual responsiveness presented in the form of visual feedback allows the user 112 to know that the user device 902 is aware of the user's movements, which serves to educate the user 112 about the user device's awareness and capabilities while in a low-power or locked state.

To further enhance the user experience in regards to the user device's responsiveness to the user's movements relative to the user device 902, the interaction manager 106 may cause the multi-mode interface 114 to enter an active mode 1006 in response to the user 112 being authenticated by the user device 902. When transitioning from the alert mode 1002 to the active mode 1006, color-saturation of the multi-mode interface 114 is increased such that the image 908 is gradually filled with color. Accordingly, the user device 902-6 provides visual feedback, through the use of color, to indicate that the user 112 has been authenticated and is provided full access rights to the user device 902 by providing a high-luminosity and color saturation display. In addition the multi-mode interface 114 provides continuously-responsive visual feedback corresponding to positional information and movements of the user or the user's hand relative to the user device. The multi-mode interface 114 can also be adjusted in other aspects based on authentication of the user 112, such as by changing a position of or replacing one or more displayed elements (e.g., replacing the lock icon 910 with an unlock icon 1008). These modifications can occur prior to presenting a home screen of the user device 902 or as part of the presentation of the home screen. The home screen, and additional pages, may be presented via the multi-mode interface 114 in the active mode 1006. The image 908 and/or other objects or elements may be maintained on the multi-mode interface 114 simultaneously with user-interface elements that are displayed on the home screen and additional pages.

The image 908 described with respect to FIGS. 9 and 10 may be a still image selected as part of a theme package of the operating system of the user device 902. Alternatively, the image 908 may be a user-selected still image, such as a digital photo or drawing, stored in the computer-readable media 204. In this way, the user 112 may customize the image displayed via the multi-mode interface 114 of the user device 902. Each image may be unique in how it is gradually revealed based on luminosity changes. Further, each image may be unique in how it is filled with color based on saturation changes when the user 112 is authenticated to the user device 902.

Other visual effects of the multi-mode interface 114 that correspond to radar-detected movements of the user 112 relative to the user device 902 are also contemplated. For example, rather than a still image, the image 908 may include a curated collection of images, a family of related images, or a sequence of images (e.g., video). A collection of images can be used to produce one or more objects or images that respond to the user's implicit interactions with the user device 902, such as by moving in subtle ways in association with the user's hand 1004 movements and position relative to the user device 902. One example of this is shown in FIG. 11-1.

Figures 1, 11:
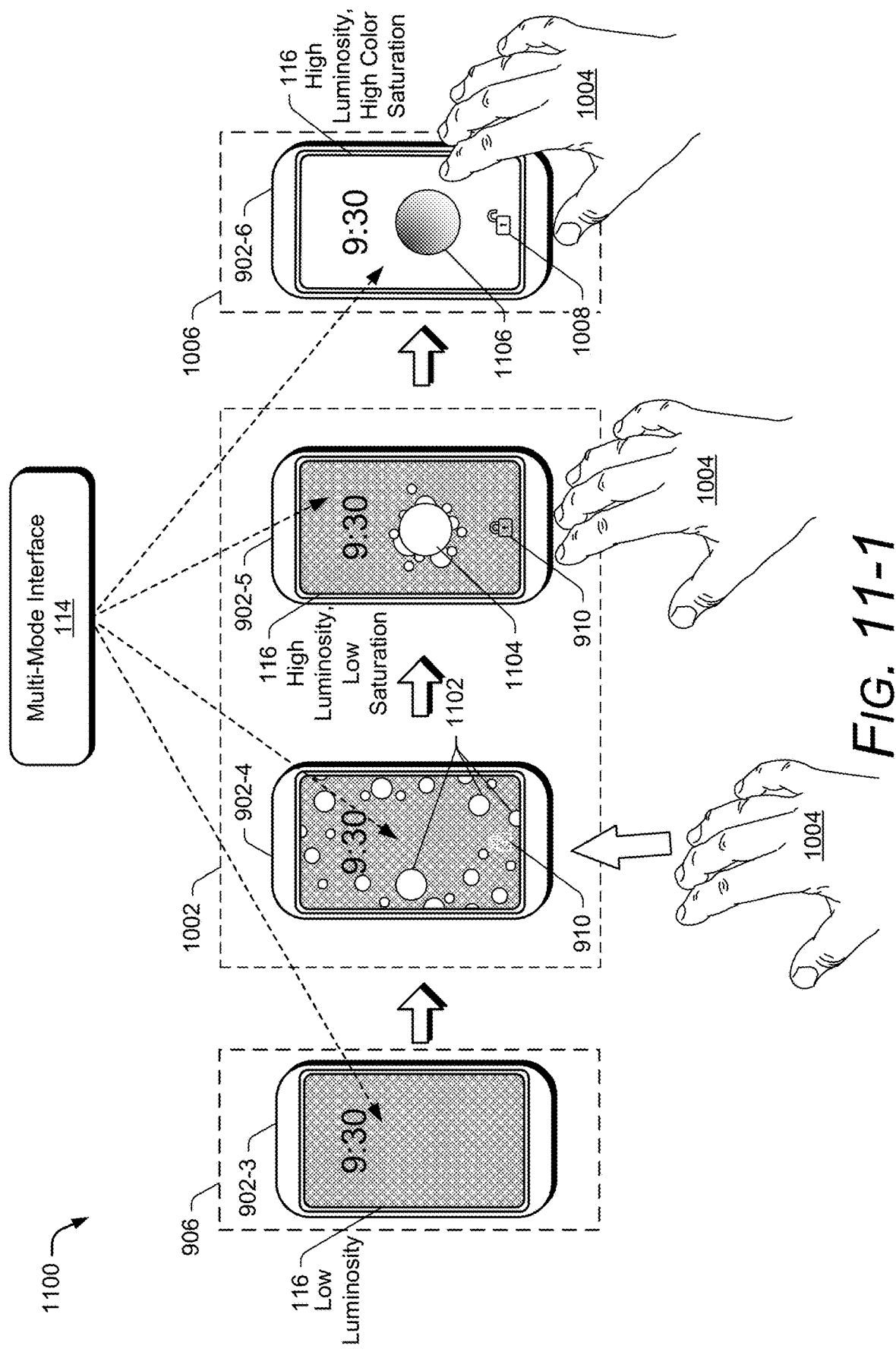

FIG. 11-1 illustrates an example implementation 1100 of the multi-mode interface that changes modes based on radar data indicating a user's implicit interactions with a mobile device. Here, the user device 902-3 is illustrated with the multi-mode interface 114 in the ambient mode 906 (e.g., darkened state) based on the user's 112 presence being detected within the radar field 110 (not shown). In this example, no objects are displayed via the multi-mode interface 114. When the user 112 begins to reach toward the user device 902-4, the interaction manager 106 causes the multi-mode interface 114 to exit the ambient mode 906 and enter the alert mode 1002. In the alert mode 1002, one or more objects, such as small bubbles 1102, start coming into view from the sides of the multi-mode interface 114. As the user's hand 1004 gets closer to the user device 902-5, the bubbles 1102 progressively move toward a specified location. The rate at which the bubbles move may directly correspond to the rate at which the distance between the user's hand 1004 and the user device 902 decreases. In some aspects, as the user's hand 1004 gets closer to the user device 902, the bubbles 1102 combine with one another and grow in size (shown as combining bubbles 1104) until there is only one large bubble 1106 at the specified location. During this movement towards the specified location, the bubbles 1102, 1104 may become more luminous, particular as they combine with one another. If the user's hand 1004 moves away from the user device 902-5, the bubbles 1104 start to pull apart from one another and move back toward the sides of the multi-mode interface 114. The luminosity of the bubbles 1102, 1104 may also decrease as they move away from each other.

At some point, the user 112 may be authenticated to the user device 902 by a user-recognition system (e.g., based on a password, a passcode, a fingerprint, and so on). In response to the user 112 being authenticated, the multi-mode interface 114 enters the active mode 1006. Upon entering the active mode 1006, the interaction manager 106 adjusts display parameters of the multi-mode interface 114, such as color saturation. Here, the one large bubble 1106 gradually progresses from grayscale to color to provide an indication that the user 112 has been authenticated to full rights. Additional lighting effects may be applied based on the position of the user's hand 1004 relative to the user device 902. Here, the user's hand 1004 is located to the lower right side of the user device 902 (when in a portrait mode orientation) and based on this positioning, lighting effects are applied to the bubble 1106 as if the user's hand 1004 were a light source shining light onto the bubble 1106. Alternatively, the positioning of the user's hand 1004 can be used to apply lighting effects in the opposite direction to produce the visual effect that the light source is shining toward the user's hand 1004. Of course, a lighting effect(s) can be applied in any suitable direction based on the relative positioning of the user's hand 1004.

As part of the applied visual effects that indicate that the user 112 has been authenticated, the bubble 1106 may move to a different location. For example, the bubble 1106 may quickly move toward or away from the user's hand 1004. The bubble 1106 may move toward and collide with the lock icon 910, causing the lock icon 910 to be replaced with the unlock icon 1008. This may produce a dramatic effect of the lock being broken open by the bubble 1106. In some aspects, the bubble 1106 may change shape, size, or color. Accordingly, a variety of changes may occur in response to the multi-mode interface 114 entering the active mode 1006.

In another example, the curated collection of images can include abstract shapes that, during the alert mode 1002 of the multi-mode interface 114, move, bend, and/or reshape based on the user's hand 1004 movements and relative positioning. This may be in addition to the change in luminosity as described above. Each of the images may be associated with unique positioning information corresponding to a position of the user's hand 1004 relative to the user device 902 (e.g., distance between the user device 902 and the user's hand 1004 combined with a location of the user's hand 1004 relative to an orientation of the user device 902). This allows a different image to be presented based on where the user's hand 1004 is positioned (proximity and direction) relative to the user device 902. In this way, the abstract shapes or other displayed objects may appear to react to the user's hand movements around the user device 902 in subtle and interesting ways, while the user device 902 is in a locked state. An example of this is described below in relation to FIG. 11-2.

FIG. 11-2 illustrates another example implementation 1150 of a multi-mode interface that changes modes based on radar data indicating a user's implicit interactions with a mobile device. Here, the user device 902-3 is illustrated with the multi-mode interface 114 in the ambient mode 906 based on the user's presence being detected within the radar field 110 (not shown). In this example, objects 1152 are provided in a low-luminosity display by the multi-mode interface 114. The objects are rendered via the display 116. The objects 1152 can be any object, shape, or image. The objects 1152 have an initial position during the ambient mode 906 of the multi-mode interface 114, an example of which is illustrated on the display 116 of user device 902-3.

When the user 112 begins to reach toward the user device 902-4, the interaction manager 106 causes the multi-mode interface 114 to exit the ambient mode 906 and enter the alert mode 1002. In the alert mode 1002, one or more of the objects 1152 move. As the user's hand 1004 gets closer to the user device 902-5, the objects 1152 continue to move. The rate and/or distance that the objects 1152 move may directly correspond to the rate at which the distance between the user's hand 1004 and the user device 902 decreases. The objects 1152 can move in any direction and can change directions based on how close the user's hand 1004 is to the user device 902. In addition to, or alternative to, shifting in a certain direction, the movement of the objects 1152 may include 3D rotation in any direction. Further, each object 1152 may move independently of the other objects 1152. One or more of the objects 1152 may also change its shape or size as the user's hand 1004 approaches the user device 902.

Similar to the above-described implementations, the multi-mode interface 114 may provide a low-luminosity display during the ambient mode 906 and initially during the alert mode 1002. The luminosity during the alert mode 1002 is adjustable based on the changing distance between the user device 902 and the user's hand 1004. In some aspects, the multi-mode interface 114 provides a monochrome display during the ambient mode 906 and the alert mode 1002. Alternatively, the multi-mode interface 114 can provide a low color saturation display during these modes.

In response to the user being authenticated to the user device 902, the multi-mode interface 114 enters the active mode 1006. Upon entering the active mode 1006, the interaction manager 106 adjusts display parameters of the multi-mode interface 114, such as color saturation. Here, the objects 1152 progress from grayscale to color to provide a visual indication that the user 112 has been authenticated to full rights. For example, as shown on user device 902-6, the multi-mode interface 114 provides a high-luminosity and high-saturation display. As in the other described implementations, additional lighting effects can be applied to the objects 1152 in any suitable way. The objects 1152 an also move further in response to the authentication. Here, the objects 1152 moved back toward their original positions in the ambient mode 906. However, the objects 1152 may or may not reach those original positions.

Example Methods

Figure 12:
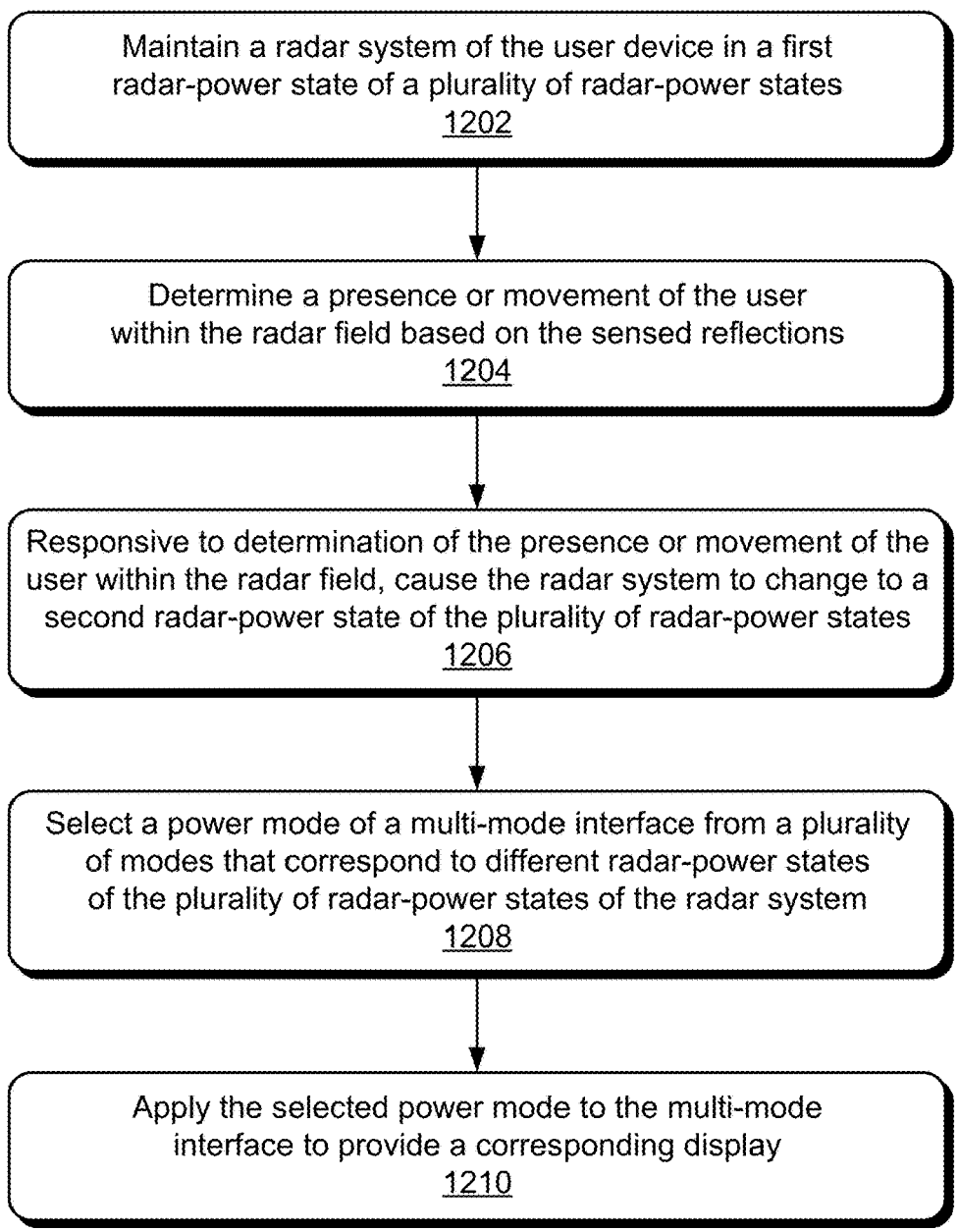
FIG. 12 depicts a method for managing power modes of a multi-mode interface based on radar-power states of a radar system of the user device.

FIG. 12 depicts an example method 1200 for managing power modes of a multi-mode interface based on radar-power states of a radar system of the user device. In aspects, the power modes are managed based on a level of implicit interaction by a user with the user device. The method 1200 can be performed by the user device 102, which uses the radar system 104 to provide a radar field. The radar field is used to determine implicit interactions of the user with the user device, such as a presence of the user within the radar field and movement of the user relative to the user device. Based on the determination of the user's presence and movements, the electronic device can apply a radar-power state to the radar system and apply a corresponding power mode to a multi-mode interface to enter and exit different modes of functionality.

The method 1200 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-11, reference to which is made for example only. The techniques are not limited to performance by one entity or multiple entities operating on one device.

At 1202, a power management module maintains a radar system of the user device in a first radar-power state of a plurality of radar-power states. This power management module (e.g., power management module 320) controls the radar-power state of the radar system (e.g., the radar system 104) based on the level of interaction by a user with the user device, to reduce power consumption when the user is not fully engaged with the user device. Each of the radar-power states have a different maximum power-usage limit. In aspects, each radar-power state uses a different duty cycle. The first radar-power state described above is sufficient to generate a radar field (e.g., the radar field 110) and sense reflections from a user (e.g., the user 112) within the radar field.

At 1204, an interaction manager determines a presence or movement of the user within the radar field based on the sensed reflections. The interaction manager (e.g., the interaction manager 106, which may also include the multi-mode interface 114) can obtain radar data representing the sensed reflections from the radar system 104. Using this radar data, the interaction manager can detect that: the user is entering the radar field, the user is present or moving within the radar field without explicitly interacting with the user device, the movement of the user includes the user's hand moving toward or away from the user device, or the user is exiting the radar field.

At 1206, responsive to the determining of the presence or movement of the user within the radar field, the power management module causes the radar system to change to a second radar-power state of the plurality of radar-power states. In aspects, the second radar-power state enables different functionality than that of the first radar-power state. For example, the power management module can enable the radar system to execute a presence operation corresponding to the second radar-power state. The presence operation may be configured to provide the radar data for detecting at least the presence of the user within the radar field and other data usable to determine implicit interaction by the user with the user device. Further, the presence operation may correspond to an ambient mode of the multi-mode interface. In another example, the power management module can enable the radar system to execute an awareness operation corresponding to the second radar-power state. The awareness operation may be configured to provide the radar data for detecting the presence of the user within the radar field and other radar data usable to determine implicit interaction by the user with the user device. Further, the awareness operation may correspond to an alert mode of the multi-mode interface. In yet another example, if the user is also authenticated to the user device, the power management module can enable the radar system to execute an engagement operation corresponding to the second radar-power state. The engagement operation enables the radar system to provide other radar data usable to detect and process radar-based air gestures that enable the user to explicitly interact with the user device.

At 1208, responsive to or incident with the radar system changing to the second radar-power state, the interaction manager module selects a power mode from a plurality of power modes for a multi-mode interface. The interaction manager module can use the radar data to determine a level of interaction by the user with the user device and then select which power mode of the plurality of power modes for the multi-mode interface is best-suited for the level of interaction. In aspects, at least two of the plurality of power modes may correspond to different radar-power states of the plurality of radar-power states of the radar system. For example, the dormant mode of the multi-mode interface may correspond to the idle mode (e.g., using a low duty cycle in the pre-presence pipeline) of the radar system. The ambient mode of the multi-mode interface may correspond to the attention mode (e.g., using a medium-low duty cycle in the presence pipeline) of the radar system. The alert mode of the multi-mode interface may correspond to the attention mode (e.g., using a medium-high duty cycle in the awareness pipeline) of the radar system. The active mode of the multi-mode interface may correspond to the interaction mode (e.g., using a high duty cycle in the engagement pipeline) of the radar system. Alternatively, the power mode of the multi-mode interface may be selected and applied independent from the radar-power state. In one example, the power mode of the multi-mode interface may be selected and applied prior to or without changing the radar-power state from a first radar-power state to a second radar-power state.

At 1210, the interaction manager applies the selected power mode to the multi-mode interface to provide a corresponding display. The interaction manager can provide any suitable display via the multi-mode interface, including a black display, a low-luminosity display, a monochrome display, or a high-luminosity and color saturation display. In aspects, the interaction manager provides the low-luminosity display responsive to the selected power mode for the multi-mode interface being the ambient mode. If the selected power mode is the alert mode, the interaction manager provides the monochrome display with a dynamically-adjustable luminosity that is adjustable based on changes to a position of the user's hand relative to the user device. If the selected power mode is the active mode, the interaction manager provides the high-luminosity and color saturation display. If the selected power mode is the dormant mode, the multi-mode interface provides the black display.

Example Computing System

Figure 13:
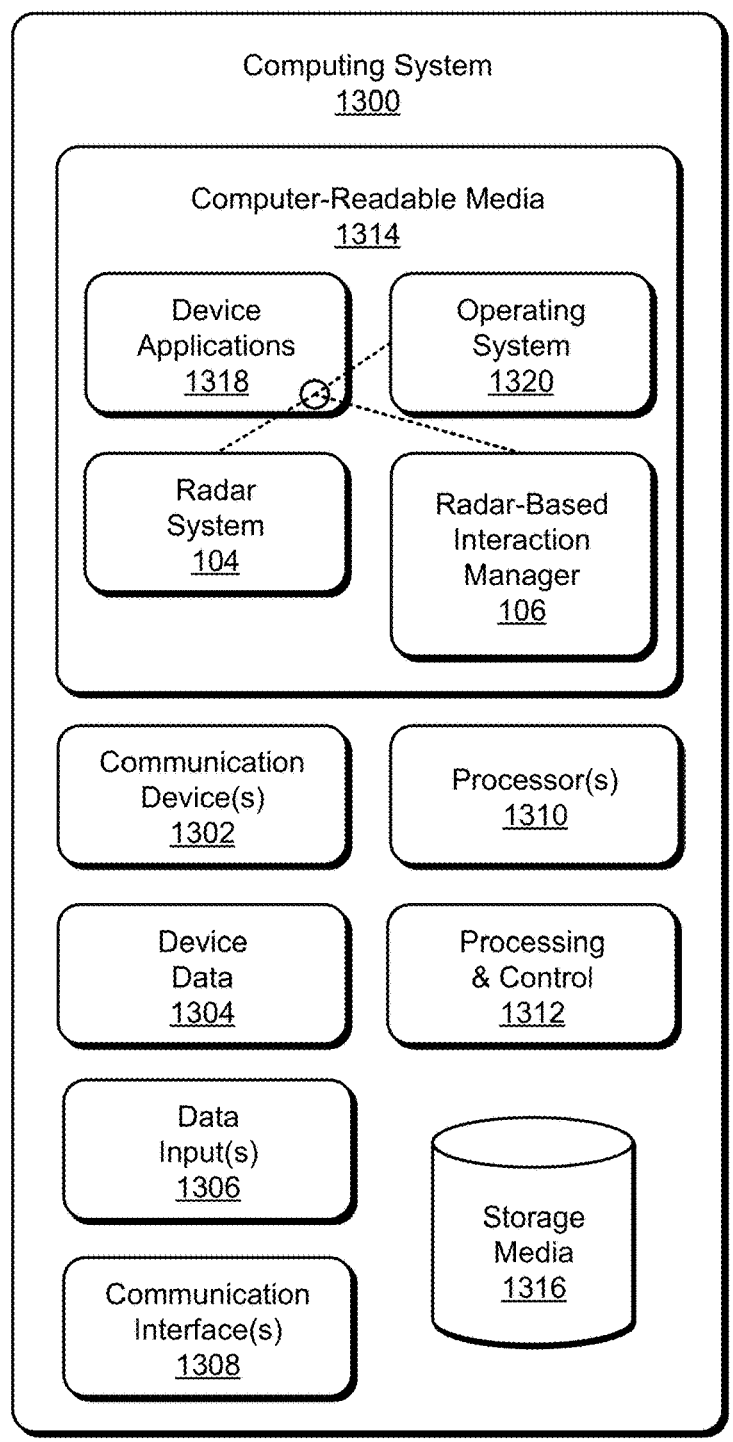
FIG. 13 illustrates an example computing system that can be implemented as any type of client, server, and/or electronic device as described with reference to FIGS. 1-12 to implement, or in which techniques may be implemented that enable, a mobile device-based radar system for applying different power modes to a multi-mode interface.

FIG. 13 illustrates various components of an example computing system 1300 that can be implemented as any type of client, server, and/or electronic device as described with reference to the previous FIGS. 1-12 to implement a mobile device-based radar system for applying different power modes to a multi-mode interface.

The computing system 1300 includes communication devices 1302 that enable wired and/or wireless communication of device data 1304 (e.g., radar data, authentication data, reference data, received data, data that is being received, data scheduled for broadcast, and data packets of the data). The device data 1304 or other device content can include configuration settings of the device, media content stored on the device, and/or information associated with a user of the device (e.g., an identity of a person within a radar field or customized air gesture data). Media content stored on the computing system 1300 can include any type of radar, biometric, audio, video, and/or image data. The computing system 1300 includes one or more data inputs 1306 via which any type of data, media content, and/or inputs can be received, such as human utterances, interactions with a radar field, touch inputs, user-selectable inputs or interactions (explicit or implicit), messages, music, television media content, recorded video content, and any other type of audio, video, and/or image data received from any content and/or data source.

The computing system 1300 also includes communication interfaces 1308, which can be implemented as any one or more of a serial and/or a parallel interface, a wireless interface, any type of network interface, a modem, and as any other type of communication interface. The communication interfaces 1308 provide a connection and/or communication links between the computing system 1300 and a communication network by which other electronic, computing, and communication devices communicate data with the computing system 1300.

The computing system 1300 includes one or more processors 1310 (e.g., any of microprocessors, controllers, or other controllers) that can process various computer-executable instructions to control the operation of the computing system 1300 and to enable techniques for, or in which can be implemented, a mobile device-based radar system for applying different power modes to a multi-mode interface. Alternatively or additionally, the computing system 1300 can be implemented with any one or combination of hardware, firmware, or fixed logic circuitry that is implemented in connection with processing and control circuits, which are generally identified at 1312. Although not shown, the computing system 1300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1300 also includes computer-readable media 1314, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1300 can also include a mass storage media device (storage media) 1316.

The computer-readable media 1314 provides data storage mechanisms to store the device data 1304, as well as various device applications 1318 and any other types of information and/or data related to operational aspects of the computing system 1300. For example, an operating system 1320 can be maintained as a computer application with the computer-readable media 1314 and executed on the processors 1310. The device applications 1318 may include a device manager, such as any form of a control application, software application, signal-processing and control modules, code that is native to a particular device, an abstraction module, an air gesture recognition module, and other modules. The device applications 1318 may also include system components, engines, modules, or managers to implement a mobile device-based radar system for applying different power modes to a multi-mode interface, such as the radar system 104 or the radar-based interaction manager 106. The computing system 1300 may also include, or have access to, one or more machine learning systems.

Several examples are described below.

Example 1. A user device comprising:

a radar system implemented at least partially in hardware, the radar system configured to:

generate a radar field and provide radar data corresponding to reflections from a user within the radar field; and operate at one of a plurality of radar-power states including a first radar-power state and a second radar-power state, the plurality of radar-power states each having a different maximum power-usage limit;

a processor configured to analyze the radar data to detect a presence or movement of the user within the radar field;

a power management module configured to:

maintain the radar system in the first radar-power state, the first radar-power state sufficient to at least detect the presence or movement of the user within the radar field; and based on a determination of the user's presence or movement, cause the radar system to change to the second radar-power state; and an interaction manager module configured to:

select, based on the determination of the user's presence or movement, a power mode of a multi-mode interface from a plurality of power modes that correspond to different radar-power states of the plurality of radar-power states of the radar system; and apply the selected power mode to the multi-mode interface to provide a corresponding display, the corresponding display including a black display, a low-luminosity display, a monochrome display, or a high-luminosity and color saturation display.

Example 2. The user device of example 1, wherein:

the radar data is determined by the power management module to indicate that the user is present or moving within a specified range of the user device without explicitly interacting with the user device;

responsive to the radar data indicating that the user is present or moving within a specified range of the user device without explicitly interacting with the user device, the power management module selects the second radar-power state from the plurality of radar-power states based on a correlation between the second radar-power state and a level of interaction indicated by the radar data;

the second radar-power state enables an awareness operation in which the radar system is configured to provide other radar data usable to determine a presence of the user or threshold movement of the user in relation to the user device;

responsive to the radar data indicating that the user is present or moving within a specified range of the user device without explicitly interacting with the user device, the interaction management module selects the power mode of the multi-mode interface to be an ambient mode that enables the multi-mode interface to provide the low-luminosity display.

Example 3. The user device of example 1, wherein:

the radar data is determined by the power management module to indicate that the movement of the user includes the user's hand moving toward the user device;

responsive to the radar data indicating that the movement of the user includes the user's hand moving toward the user device, the power management module selects the second radar-power state of the radar system from the plurality of radar-power states based on a correlation between the second radar-power state and a level of interaction indicated by the radar data;

the second radar-power state enables an engagement operation in which the radar system is configured to provide other radar data usable to determine a presence or threshold movement by the user with the user device;

responsive to the radar data indicating that the movement of the user includes the user's hand moving toward the user device, the interaction manager module selects the power mode of the multi-mode interface to be an alert mode; and the alert mode enables the multi-mode interface to provide the monochrome display with a dynamically-adjustable luminosity that is adjustable based on changes in a position of the user's hand relative to the user device.

Example 4. The user device of example 1, wherein:

in response to the user being authenticated to the user device, the power management module selects the second radar-power state to enable an engagement operation;

the radar system, during the engagement operation, is configured to provide other radar data usable to detect and process radar-based air gestures that enable the user to explicitly interact with the user device; and in response to the user being authenticated to the user device, the interaction manager module selects the power mode of the multi-mode interface to be an active mode that enables the multi-mode interface to:

provide the high-luminosity and color saturation display; and provide continuously-responsive visual feedback corresponding to positional information and movements of the user or the user's hand relative to the user device.

Example 5. The user device of any of examples 1 to 4, wherein the radar system is operable to collect data a different duty cycles, to turn off at least one component when the at least one component is not active and/or to adjust a power amplification level.

Example 6. The user device of any example 1 to 5, wherein at least one function of the display, in particular the color and/or the luminosity of the display, is adaptable to an amount and/or rate of decrease in a distance between the user or a part of the user and the user device.

Example 7. The user device of any of examples 1 to 6, wherein:

the plurality of radar-power states of the radar system include at least an idle mode using a low duty cycle, an attention mode using a medium-low duty cycle or a medium-high duty cycle, and an interaction mode using a high duty cycle;

the plurality of power modes of the multi-mode interface include a dormant mode, an ambient mode, an alert mode, and an active mode;

the dormant mode corresponding to the idle mode of the radar system and enabling the multi-mode interface to provide the black display;

the ambient mode corresponding to the attention mode of the radar system that uses the medium-low duty cycle and enabling the multi-mode interface to provide the low-luminosity display;

the alert mode corresponding to the attention mode of the radar system that uses the medium-high duty cycle and enabling the multi-mode interface to provide the monochrome display with a dynamically-adjustable luminosity that is adjustable based on changes to a position of the user's hand relative to the user device within a specified distance from the user device; and the active mode corresponding to the interaction mode of the radar system and enabling the multi-mode interface to provide the high-luminosity and color saturation display.

Example 8. The user device of any of examples 1 to 7, wherein:

the plurality of radar-power states of the radar system include at least an idle mode, an attention mode, and an interaction mode;

the idle mode requires no more than approximately 30 milliwatts (mW) of power;

the attention mode requires no more than approximately 60 mW of power; and the interaction mode requires no more than approximately 90 mW of power.

Example 9. The user device of example 1, wherein:

the movement of the user includes the user exiting the radar field;

the second radar-power state corresponds to a pre-presence operation for the radar system; and the selected power mode of the multi-mode interface comprises a dormant mode; and in the dormant mode, the multi-mode interface provides the black display.

Example 10. The user device of any example 1 to 9, wherein the radar system comprises at least one digital beamformer, in particular implemented using a single-look beamformer, a multi-look interferometer or a multi-look beamformer.

Example 11. The user device of example 10, wherein the at least one digital beamformer is operable to form radar breams that are steered or unsteered, wide or narrow, or shaped, in particular as a hemisphere, as a cube, as a fan, as a cone, or as a cylinder.

Example 12. The user device of any example 1 to 11, wherein the radar system comprises at least one angle estimator for analyzing differences in detected radar signals, in particular amplitude responses.

Example 13. A method implemented in a user device for managing power modes of a multi-mode interface based on radar-power states of a radar system of the user device, the method comprising:

maintaining, by a power management module, a radar system of the user device in a first radar-power state of a plurality of radar-power states, the plurality of radar-power states each having a different maximum power-usage limit, the first radar-power state sufficient to generate a radar field and sense reflections from a user within the radar field;

determining, by an interaction manager, a presence or movement of the user within the radar field based on the sensed reflections;

responsive to the determining of the presence or movement of the user within the radar field, causing, by the power management module, the radar system to change to a second radar-power state of the plurality of radar-power states;

responsive to or incident with the radar system changing to the second radar-power state, selecting, by the interaction manager module, a power mode from a plurality of power modes for a multi-mode interface, at least two of the plurality of power modes corresponding to different radar-power states of the plurality of radar-power states of the radar system; and applying, by the interaction manager, the selected power mode to the multi-mode interface to provide a corresponding display, the corresponding display including a black display, a low-luminosity display, a monochrome display, or a high-luminosity and color saturation display.

Example 14. The method of example 13, further comprising:

detecting, based on the sensed reflections, that the user is present or moving within the radar field without explicitly interacting with the user device;

enabling a presence operation of the radar system based on the change to the second radar-power state, the presence operation configured to provide radar data corresponding to the sensed reflections for determining a presence or threshold movement of the user in relation to the user device; and providing the low-luminosity display responsive to the selected power mode for the multi-mode interface being an ambient mode, the ambient mode selected based on the user being present or moving within the radar field without explicitly interacting with the user device.

Example 15. The method of any of examples 13 or 14, further comprising:

detecting, based on the sensed reflections, that the movement of the user includes a user's hand moving toward the user device;

enabling an awareness operation of the radar system based on the change to the second radar-power state, the awareness operation configured to provide radar data based on the sensed reflections for tracking the user and monitoring a distance between the user and the user device; and responsive to the selected power mode for the multi-mode interface being an alert mode, providing the monochrome display with a dynamically-adjustable luminosity that is adjustable based on changes to a position of the user's hand relative to the user device.

Example 16. The method of any of examples 13 to 15, wherein the radar system collects data using different duty cycles, turns off at least one component when the component is not active and/or adjusts a power amplification level.

Example 17. The method of any example 13 to 16, wherein at least one function of the display, in particular the color and/or the luminosity of the display, adapts to the amount and/or rate of decrease in the distance between the user or a part of the user and the user device.

Example 18. The method of any of examples 13 to 17, wherein at least one digital beamformer operates to form a radar beam that is steered or unsteered, wide or narrow, or shaped, in particular as a hemisphere, as a cube, as a fan, as a cone, or as a cylinder.

Example 19. The method of any example 13 to 18, wherein the radar system comprises at least one angle estimator that analyzes differences in amplitude responses of detected radar signals.

Example 20. The method of any of examples 13 to 19, further comprising:

authenticating the user to the user device; and responsive to authenticating the user:

enabling an engagement operation of the radar system to provide radar data based on the sensed reflections for detecting and processing radar-based air gestures representing explicit interactions by the user with the user device;

selecting and applying an active mode for the multi-mode interface; and responsive to selecting and applying the active mode for the multi-mode interface, providing the high-luminosity and color saturation display.

Example 21. The method of example 13, further comprising:

responsive to selecting and applying the active mode for the multi-mode interface, applying one or more lighting effects to the high-luminosity and color saturation display to provide visual feedback corresponding to the authenticating of the user.

Example 22. The method of any of examples 13 to 21 wherein:

the plurality of radar-power states of the radar system include at least an idle mode using a low duty cycle, an attention mode using a medium-low duty cycle or a medium-high duty cycle, and an interaction mode using a high duty cycle;

the plurality of power modes of the multi-mode interface include a dormant mode, an ambient mode, an alert mode, and an active mode;

the dormant mode corresponds to the idle mode of the radar system and enables the multi-mode interface to provide the black display;

the ambient mode corresponds to the attention mode that uses the medium-low duty cycle and enables the multi-mode interface to provide the low-luminosity display;

the alert mode corresponds to the attention mode that uses the medium-high duty cycle and enables the multi-mode interface to provide the monochrome display with a dynamically-adjustable luminosity that is adjustable based on changes to a position of a user's hand relative to the user device within a specified distance from the user device; and the active mode corresponds to the interaction mode of the radar system and enables the multi-mode interface to provide the high-luminosity and color saturation display.

Example 23. The method of any of examples 13 to 22, wherein:

the plurality of radar-power states of the radar system include at least an idle mode, an attention mode, and an interaction mode; and the idle mode requires no more than approximately 30 milliwatts (mW) of power;

the attention mode requires no more than approximately 60 mW of power; and the interaction mode requires no more than approximately 90 mW of power.

Example 24. The method of example 13, wherein:

the determining comprises determining that the movement of the user includes the user exiting the radar field;

responsive to the determining of the user exiting the radar field, selecting the second radar-power state to be an idle state, the idle state of the radar system corresponding to a pre-presence operation for the radar system;

the selected power mode of the multi-mode interface comprises a dormant mode, the dormant mode of the multi-mode interface corresponding to the idle state of the radar system; and the dormant mode enables the multi-mode interface to provide the black display.

CONCLUSION

Although implementations of techniques for, and apparatuses enabling, a mobile device-based radar system for applying different power modes to a multi-mode interface have been described in language specific to features and/or methods, it is to be understood that the subject of the appended claims is not necessarily limited to the specific features or methods described. Rather, the specific features and methods are disclosed as example implementations enabling a mobile device-based radar system for applying different power modes to a multi-mode interface.

What is claimed is:

1. A user device comprising:

a radar system implemented at least partially in hardware, the radar system configured to:
  generate a radar field and provide radar data corresponding to reflections from a user within the radar field; and
  operate at one of a plurality of radar-power states including a first radar-power state and a second, higher radar-power state;

a processor configured to analyze the radar data to detect a presence or movement of the user within the radar field;

a battery power management module configured to:
  maintain the radar system in the first radar-power state, the first radar-power state sufficient to at least detect the presence or movement of the user within the radar field; and
  based on a determination of the user's presence or movement, cause the radar system to change to the second radar-power state; and an interaction manager module configured to:
  determine a level of interaction by the user with the user device based on the determination of the user's presence or movement;
  select, based on the determination of the level of interaction by the user with the user device, a battery power mode from a plurality of battery power modes; and
  apply the selected battery power mode to provide a corresponding display that provides visual feedback corresponding to the level of interaction by the user with the user device, the corresponding display including a low-luminosity display, a monochrome display, or a high-luminosity and color saturation display.

2. The user device of claim 1, wherein:

the radar data is determined by the battery power management module to indicate that the user is present or moving within a specified range of the user device without explicitly interacting with the user device;

responsive to the radar data indicating that the user is present or moving within a specified range of the user device without explicitly interacting with the user device, the battery power management module selects the second radar-power state from the plurality of radar-power states based on a correlation between the second radar-power state and the level of interaction by the user with the user device as indicated by the radar data;

the second radar-power state enables an awareness operation in which the radar system is configured to provide other radar data usable to determine a presence of the user or threshold movement of the user in relation to the user device; and responsive to the radar data indicating that the user is present or moving within the specified range of the user device without explicitly interacting with the user device, the interaction management module selects the battery power mode to be an ambient mode that provides the low-luminosity display.

3. The user device of claim 1, wherein:

the radar data is determined by the battery power management module to indicate that the movement of the user includes the user's hand moving toward the user device;

responsive to the radar data indicating that the movement of the user includes the user's hand moving toward the user device, the battery power management module selects the second radar-power state of the radar system from the plurality of radar-power states based on a correlation between the second radar-power state and the level of interaction by the user with the user device as indicated by the radar data;

the second radar-power state enables an engagement operation in which the radar system is configured to provide other radar data usable to determine a presence or threshold movement by the user with the user device;

responsive to the radar data indicating that the movement of the user includes the user's hand moving toward the user device, the interaction manager module selects the battery power mode to be an alert mode; and the alert mode provides the monochrome display with a dynamically-adjustable luminosity that is adjustable based on changes in a position of the user's hand relative to the user device.

4. The user device of claim 1, wherein:

in response to the user being authenticated to the user device, the battery power management module selects the second radar-power state to enable an engagement operation;

the radar system, during the engagement operation, is configured to provide other radar data usable to detect and process radar-based air gestures that enable the user to explicitly interact with the user device; and in response to the user being authenticated to the user device, the interaction manager module selects the battery power mode to be an active mode that:
provides the high-luminosity and color saturation display; and
provides continuously-responsive visual feedback corresponding to positional information and movements of the user or the user's hand relative to the user device.

5. The user device of claim 1, wherein the radar system is operable to collect data at different duty cycles, to turn off at least one component when the at least one component is not active or to adjust a power amplification level.

6. The user device of claim 1, wherein at least one function of the display is adaptable to an amount or rate of decrease in a distance between the user or a part of the user and the user device, the at least one function including a color or a luminosity of the display.

7. The user device of claim 1, wherein:

the plurality of radar-power states of the radar system include at least an idle mode using a low duty cycle, an attention mode using a medium-low duty cycle or a medium-high duty cycle, and an interaction mode using a high duty cycle;

the plurality of battery power modes include a dormant mode, an ambient mode, an alert mode, and an active mode;

the dormant mode corresponds to the idle mode of the radar system and provides a black display;

the ambient mode corresponds to the attention mode of the radar system that uses the medium-low duty cycle and provides the low-luminosity display;

the alert mode corresponds to the attention mode of the radar system that uses the medium-high duty cycle and provides the monochrome display with a dynamically-adjustable luminosity that is adjustable based on changes to a position of the user's hand relative to the user device within a specified distance from the user device; and the active mode corresponds to the interaction mode of the radar system and provides the high-luminosity and color saturation display.

8. The user device of claim 1, wherein:

the plurality of radar-power states of the radar system include at least an idle mode, an attention mode, and an interaction mode;

the idle mode requires no more than approximately 30 milliwatts (mW) of power;

the attention mode requires no more than approximately 60 mW of power; and the interaction mode requires no more than approximately 90 mW of power.

9. The user device of claim 1, wherein:

the movement of the user includes the user exiting the radar field;

the second radar-power state corresponds to a pre-presence operation for the radar system;

the selected battery power mode of the multi-mode interface comprises a dormant mode; and the dormant mode provides a black display.

10. The user device of claim 1, wherein the radar system comprises at least one digital beamformer, the at least one digital beamformer implemented using a single-look beamformer, a multi-look interferometer, or a multi-look beamformer.

11. The user device of claim 10, wherein the at least one digital beamformer is operable to form radar beams that are shaped as a hemisphere, a cube, a fan, a cone, or a cylinder.

12. The user device of claim 1, wherein the radar system comprises at least one angle estimator for analyzing differences in amplitude responses of detected radar signals.

13. A method implemented in a user device for managing battery power modes of the user device, the method comprising:

maintaining, by a battery power management module, a radar system of the user device in a first radar-power state of a plurality of radar-power states, the first radar-power state sufficient to generate a radar field and sense reflections from a user within the radar field;

determining, by an interaction manager, a presence or movement of the user within the radar field based on the sensed reflections;

responsive to the determining of the presence or movement of the user within the radar field, causing, by the battery power management module, the radar system to change to a second radar-power state of the plurality of radar-power states, the second radar-power state being a higher power state than the first radar-power state;

responsive to or incident with the radar system changing to the second radar-power state:
determining a level of interaction by the user with the user device based on the determined presence or movement of the user within the radar field;
selecting, by the interaction manager module and based on the determining of the level of interaction by the user with the user device, a battery power mode from a plurality of battery power modes; and
applying, by the interaction manager, the selected battery power mode to provide a corresponding display that provides visual feedback corresponding to the level of interaction by the user with the user device, the corresponding display including a low-luminosity display, a monochrome display, or a high-luminosity and color saturation display.

14. The method of claim 13, further comprising:
detecting, based on the sensed reflections, that the user is present or moving within the radar field without explicitly interacting with the user device;
enabling a presence operation of the radar system based on the change to the second radar-power state, the presence operation configured to provide radar data corresponding to the sensed reflections for determining a presence or threshold movement of the user in relation to the user device; and
providing the low-luminosity display responsive to the selected battery power mode being an ambient mode, the ambient mode selected based on the user being present or moving within the radar field without explicitly interacting with the user device.

15. The method of claim 13, further comprising:
detecting, based on the sensed reflections, that the movement of the user includes a user's hand moving toward the user device;
enabling an awareness operation of the radar system based on the change to the second radar-power state, the awareness operation configured to provide radar data based on the sensed reflections for tracking the user and monitoring a distance between the user's hand and the user device; and
responsive to the selected battery power mode being an alert mode, providing the monochrome display with a dynamically-adjustable luminosity that is adjustable based on changes to a position of the user's hand relative to the user device.

16. The method of claim 13, wherein the radar system collects data using different duty cycles, turns off at least one component when the component is not active, or adjusts a power amplification level.

17. The method of claim 13, wherein at least one function of the display, in particular the color or the luminosity of the display, adapts to the amount or rate of decrease in the distance between the user, or a part of the user, and the user device.

18. The method of claim 13, wherein at least one digital beamformer operates to form a radar beam that is shaped as a hemisphere, a cube, a fan, a cone, or a cylinder.

19. The method of claim 13, wherein the radar system comprises at least one angle estimator that analyzes differences in amplitude responses of detected radar signals.

20. The method of claim 13, further comprising:
authenticating the user to the user device; and
responsive to authenticating the user:
enabling an engagement operation of the radar system to provide radar data based on the sensed reflections for detecting and processing radar-based air gestures representing explicit interactions by the user with the user device;
selecting and applying an active mode for the battery power mode; and
responsive to selecting and applying the active mode for the battery power mode, providing the high-luminosity and color saturation display.

21. The method of claim 20, further comprising:
responsive to providing the high-luminosity and color saturation display, applying one or more lighting effects to the high-luminosity and color saturation display to provide visual feedback corresponding to the authenticating of the user.

22. The method of claim 13, wherein:
the plurality of radar-power states of the radar system include at least an idle mode using a low duty cycle, an attention mode using a medium-low duty cycle or a medium-high duty cycle, and an interaction mode using a high duty cycle;
the plurality of battery power modes include a dormant mode, an ambient mode, an alert mode, and an active mode;
the dormant mode corresponds to the idle mode of the radar system and provides a black display;
the ambient mode corresponds to the attention mode that uses the medium-low duty cycle and provides the low-luminosity display;
the alert mode corresponds to the attention mode that uses the medium-high duty cycle and provides the monochrome display with a dynamically-adjustable luminosity that is adjustable based on changes to a position of a user's hand relative to the user device within a specified distance from the user device; and
the active mode corresponds to the interaction mode of the radar system and provides the high-luminosity and color saturation display.

23. The method of claim 13, wherein:
the plurality of radar-power states of the radar system includes at least an idle mode, an attention mode, and an interaction mode;
the idle mode requires no more than approximately 30 milliwatts (mW) of power;
the attention mode requires no more than approximately 60 mW of power; and
the interaction mode requires no more than approximately 90 mW of power.

24. The method of claim 13, wherein:
the determining comprises determining that the movement of the user includes the user exiting the radar field;
the method further comprises, responsive to the determining of the user exiting the radar field, selecting the second radar-power state to be an idle state;
the idle state of the radar system corresponds to a pre-presence operation for the radar system;
the selected battery power mode comprises a dormant mode; and
the dormant mode corresponds to the idle state of the radar system and provides a black display.

25. An electronic device comprising:
a radar system implemented at least partially in hardware, the radar system configured to:
generate a radar field and provide radar data corresponding to reflections from a user within the radar field; and
operate at one of a plurality of radar-power states including a first radar-power state and a second, higher radar-power state;
a processor configured to analyze the radar data to detect a presence or movement of the user within the radar field;
a battery power management module configured to cause, responsive to detection of the user within a specified range of the electronic device using the first radar-power state and a first battery power mode of a plurality of battery power modes, the radar system to change to the second, higher radar-power state to provide radar data usable to determine a level of interaction of the user with the electronic device; and an interaction manager module configured to:
determine the level of interaction of the user with the electronic device based on the radar data obtained by the radar system operating at the second, higher radar-power state; and
based on the determined level of interaction of the user with the electronic device, select and apply a second, higher battery power mode from the plurality of battery power modes to provide a corresponding display that provides visual feedback corresponding to the level of interaction by the user with the electronic device, the corresponding display including a low-luminosity display, a monochrome display, or a high-luminosity and color saturation display.

26. The electronic device of claim 25, wherein:
the radar data is determined by the battery power management module to indicate that the user is present or moving within the specified range of the electronic device without explicitly interacting with the electronic device;
responsive to the radar data indicating that the user is present or moving within the specified range of the electronic device without explicitly interacting with the electronic device, the battery power management module selects the second, higher radar-power state based on the level of interaction by the user with the electronic device as indicated by the radar data;
the second, higher radar-power state enables an awareness operation in which the radar system is configured to provide other radar data usable to determine a presence of the user or threshold movement of the user in relation to the electronic device; and
responsive to the radar data indicating that the user is present or moving within the specified range of the electronic device without explicitly interacting with the electronic device, the interaction management module selects the second, higher battery power mode to be an ambient mode that provides the low-luminosity display.

27. The electronic device of claim 25, wherein:
the specified range is a first specified range;
when the radar system operates at the first radar-power state, the radar field corresponds to the first specified range; and
when the radar system operates at the second, higher radar-power state, the radar field corresponds to a second, closer specified range.

28. The electronic device of claim 27, wherein:
the radar data is determined by the battery power management module to indicate that the movement of the user includes the user's hand moving toward the electronic device within the second, closer specified range;
responsive to the radar data indicating that the movement of the user includes the user's hand moving toward the electronic device, the battery power management module selects the second, higher radar-power state of the radar system based on the level of interaction by the user with the electronic device as indicated by the radar data;
the second, higher radar-power state enables an engagement operation in which the radar system is configured to provide other radar data usable to determine a presence or threshold movement by the user with the electronic device;
responsive to the radar data indicating that the movement of the user includes the user's hand moving toward the electronic device, the interaction manager module selects the second, higher battery power mode to be an alert mode; and
the alert mode provides the monochrome display with a dynamically-adjustable luminosity that is adjustable based on changes in a position of the user's hand relative to the electronic device.

29. The electronic device of claim 27, wherein:
in response to the user being authenticated to the electronic device, the battery power management module selects the second, higher radar-power state to enable an engagement operation;
the radar system, during the engagement operation, is configured to provide other radar data usable to detect and process radar-based air gestures that enable the user to explicitly interact with the electronic device; and
in response to the user being authenticated to the electronic device, the interaction manager module selects the second, higher battery power mode to be an active mode that:
provides the high-luminosity and color saturation display; and
provides continuously-responsive visual feedback corresponding to positional information and movements of the user or the user's hand relative to the electronic device.

30. The electronic device of claim 25, wherein the radar system is operable to collect data at different duty cycles, to turn off at least one component when the at least one component is not active or to adjust a power amplification level.

31. The electronic device of claim 25, wherein at least one function of the display is adaptable to an amount or rate of decrease in a distance between the user or a part of the user and the electronic device, the at least one function including a color or a luminosity of the display.

32. The electronic device of claim 25, wherein:
the plurality of radar-power states of the radar system include at least an idle mode using a low duty cycle, an attention mode using a medium-low duty cycle or a medium-high duty cycle, and an interaction mode using a high duty cycle;
the plurality of battery power modes include a dormant mode, an ambient mode, an alert mode, and an active mode;
the dormant mode corresponds to the idle mode of the radar system and provides a black display;
the ambient mode corresponds to the attention mode of the radar system that uses the medium-low duty cycle and provides the low-luminosity display;
the alert mode corresponds to the attention mode of the radar system that uses the medium-high duty cycle and provides the monochrome display with a dynamically-adjustable luminosity that is adjustable based on changes to a position of the user's hand relative to the electronic device within a specified distance from the electronic device; and
the active mode corresponds to the interaction mode of the radar system and provides the high-luminosity and color saturation display.

33. The electronic device of claim 25, wherein:
the plurality of radar-power states of the radar system include at least an idle mode, an attention mode, and an interaction mode;
the idle mode requires no more than approximately 30 milliwatts (mW) of power;

the attention mode requires no more than approximately 60 mW of power; and the interaction mode requires no more than approximately 90 mW of power.

34. The electronic device of claim 25, wherein the radar system comprises at least one digital beamformer, the at least one digital beamformer implemented using a single-look beamformer, a multi-look interferometer, or a multi-look beamformer.

35. The electronic device of claim 34, wherein the at least one digital beamformer is operable to form radar beams that are shaped as a hemisphere, a cube, a fan, a cone, or a cylinder.

36. The electronic device of claim 25, wherein the radar system comprises at least one angle estimator for analyzing differences in amplitude responses of detected radar signals.

* * * * *